United States Patent
Puente Pestaña et al.

(10) Patent No.: US 12,022,319 B2
(45) Date of Patent: Jun. 25, 2024

(54) POLICY NODE, USER PLANE NODE, CONTROL PLANE NODE AND METHODS THEREIN FOR HANDLING QUALITY OF SERVICE IN A WIRELESS COMMUNICATIONS NETWORK

(71) Applicant: Telefonaktiebolaget LM Ericsson (publ), Stockholm (SE)

(72) Inventors: Miguel Angel Puente Pestaña, Madrid (ES); Rodrigo Alvarez Dominguez, Madrid (ES); Ruth Pallares Del Egido, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 440 days.

(21) Appl. No.: 17/299,969

(22) PCT Filed: Jan. 11, 2019

(86) PCT No.: PCT/EP2019/050622
§ 371 (c)(1),
(2) Date: Jun. 4, 2021

(87) PCT Pub. No.: WO2020/119952
PCT Pub. Date: Jun. 18, 2020

(65) Prior Publication Data
US 2022/0022092 A1    Jan. 20, 2022

(30) Foreign Application Priority Data
Dec. 12, 2018    (EP) ...................................... 18382916

(51) Int. Cl.
*H04W 28/02*    (2009.01)
*H04W 76/10*    (2018.01)

(52) U.S. Cl.
CPC ....... *H04W 28/0268* (2013.01); *H04W 76/10* (2018.02)

(58) Field of Classification Search
CPC ... H04W 28/0268; H04W 76/10; H04W 8/18; H04W 12/106; H04L 41/0893;
(Continued)

(56) References Cited

U.S. PATENT DOCUMENTS

| | | | |
|---|---|---|---|
| 2008/0013545 A1* | 1/2008 | Ono | ...................... H04L 65/104 370/395.21 |
| 2011/0167471 A1* | 7/2011 | Riley | ...................... H04W 8/18 726/1 |

(Continued)

FOREIGN PATENT DOCUMENTS

| | | |
|---|---|---|
| CN | 104284324 A | 1/2015 |
| CN | 108781381 A | 11/2018 |

(Continued)

OTHER PUBLICATIONS

ETSI TS 129 244 V14.5.0; LTE; Interface between the Control Plane and the User Plane Nodes (3GPP TS 29.244 version 14.5.0 Release 14); Oct. 2018, consisting of 171-pages. (Year: 2018).*

(Continued)

*Primary Examiner* — Ayaz R Sheikh
*Assistant Examiner* — Louis Samara
(74) *Attorney, Agent, or Firm* — Weisberg I.P. Law. P.A.

(57) ABSTRACT

A method performed by a policy node for handling QoS for data traffic between a UE and an Application Server (AS) node associated with the UE. The policy node receives messages indicating available marking types which a user plane node is capable of detecting in the data traffic and information indicating a number of marking types supported by both the UE and the AS node, a UE identifier identifying the UE and a list of QoS profiles associated with the UE. The (Continued)

policy node determines the decided marking type and marking value for each of the QoS profiles associated with the UE identifier and transmits a message towards the control plane node having a session establishment response for the UE identifier including the marking type and marking value decided for each QoS profile associated with the UE identifier.

8 Claims, 19 Drawing Sheets

(58) Field of Classification Search
CPC ....... H04L 65/104; H04L 67/61; H04L 47/20; H04L 12/1407; H04L 41/5003; H04L 5/0048; H04L 12/14
See application file for complete search history.

(56) References Cited

U.S. PATENT DOCUMENTS

| | | | | |
|---|---|---|---|---|
| 2015/0373095 | A1* | 12/2015 | Kim | ........................ H04L 67/61 709/203 |
| 2016/0073265 | A1 | 3/2016 | Vutukuri et al. | |
| 2016/0080276 | A1* | 3/2016 | Basilier | .................... H04L 47/20 370/235 |
| 2018/0234876 | A1 | 8/2018 | Jheng et al. | |
| 2018/0316690 | A1* | 11/2018 | Cho | .................... H04W 12/106 |
| 2020/0267085 | A1* | 8/2020 | Nie | ..................... H04L 12/4625 |

FOREIGN PATENT DOCUMENTS

| | | | | | |
|---|---|---|---|---|---|
| CN | 111278055 | B | * | 12/2023 | ......... H04L 41/5003 |
| EP | 3629624 | B1 | * | 3/2022 | ............. H04L 12/14 |
| JP | 2018033175 | A | * | 3/2018 | ........... H04L 5/0048 |
| KR | 20200079525 | A | * | 8/2018 | |
| KR | 20200079525 | A | * | 7/2020 | |
| WO | WO-2011082036 | A2 | * | 7/2011 | ......... H04L 12/1407 |
| WO | 2018129437 | A1 | | 7/2018 | |
| WO | WO-2018137232 | A1 | * | 8/2018 | |

OTHER PUBLICATIONS

Chinese Office Action and English Summary dated Jun. 3, 2023 for Application No. 201980074275.0 consisting of 9 pages.
International Search Report and Written Opinion dated Sep. 10. 2019 for International Application No. PCT/EP2019/050622 filed Jan. 11, 2019, consisting of 10-pages.
ETSI TS 129 244 V14.5.0; LTE; Interface between the Control Plane and the User Plane Nodes (3GPP TS 29.244 version 14.5.0 Release 14); Oct. 2018, consisting of 171-pages.
3GPP TS 29.122 V15.1.0; 3rd Generation Partnership Project; Technical Specification Group Core Network and Terminals; T8 reference point for Northbound APIs; (Release 15); Sep. 2018, consisting of 273-pages.
3GPP TS 23.203 V15.4.0; 3rd Generation Partnership Project; Technical Specification Group Services and System Aspects; Policy and charging control architecture; (Release 15); Sep. 2018, consisting of 262-pages.
3GPP TS 23.214 V15.4.0; 3rd Generation Partnership Project; Technical Specification Group Services and System Aspects; Architecture enhancements for control and user plane separation of EPC nodes; Stage 2 (Release 15); Sep. 2018, consisting of 92-pages.
3GPP TS 23.401 V15.4.0; 3rd Generation Partnership Project; Technical Specification Group Services and System Aspects; General Packet Radio Service (GPRS) enhancements for Evolved Universal Terrestrial Radio Access Network (E-UTRAN) access; (Release 15); Jun. 2018, consisting of 410-pages.
3GPP TS 23.402 V15.3.0; 3rd Generation Partnership Project; Technical Specification Group Services and System Aspects; Architecture enhancements for non-3GPP accesses; (Release 15); Mar. 2018, consisting of 314-pages.

* cited by examiner

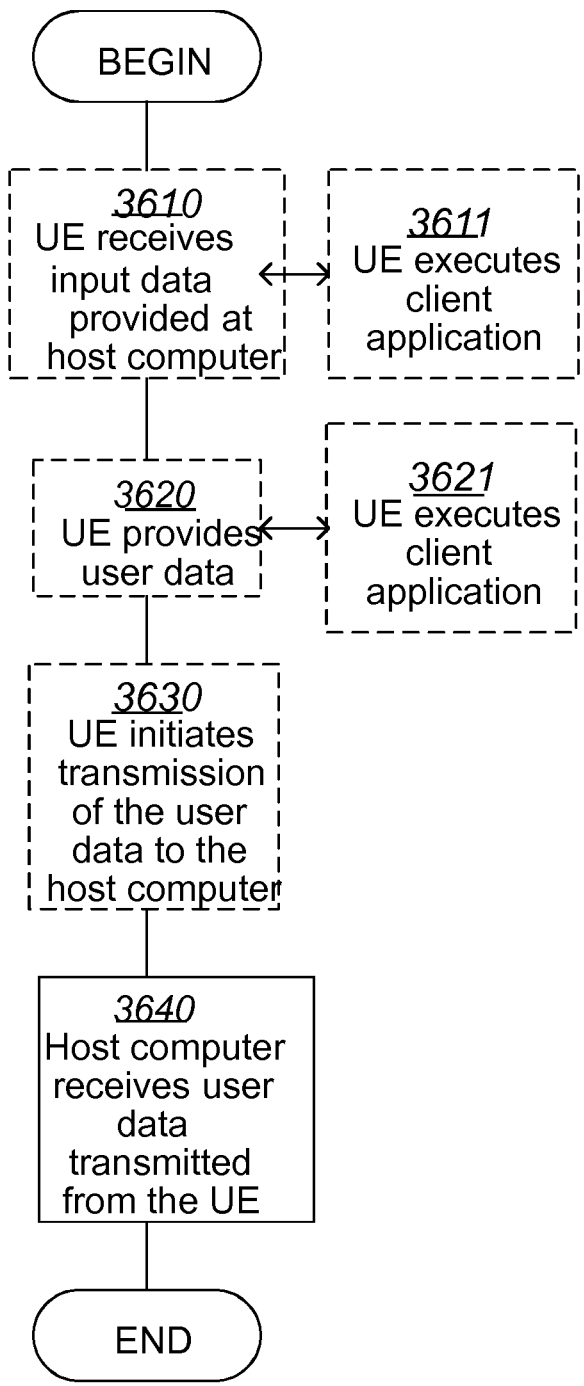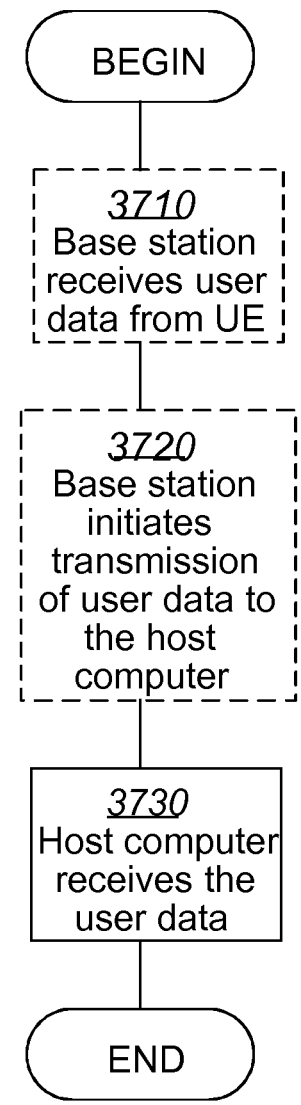
FIG 16
FIG 17

POLICY NODE, USER PLANE NODE, CONTROL PLANE NODE AND METHODS THEREIN FOR HANDLING QUALITY OF SERVICE IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application No.: PCT/EP2019/050622, filed Jan. 11, 2019 entitled "POLICY NODE, USER PLANE NODE, CONTROL PLANE NODE AND METHODS THEREIN FOR HANDLING QUALITY OF SERVICE IN A WIRELESS COMMUNICATIONS NETWORK," which claims priority to European Application No.: 18382916.7, filed Dec. 12, 2018, the entireties of both of which are incorporated herein by reference.

TECHNICAL FIELD

The present invention generally relates to Quality of Service (QoS) handling; and, more specifically, the invention relates to QoS requests by an Over the Top (OTT) or $3^{rd}$ party to an operator network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to Radio Network Controllers (RNCs) used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Functional Elements in the 3GPP Core Network

SCEF

The Service Capability Exposure Function (SCEF) is a functional element which provides a means to securely expose services and capabilities provided by 3GPP network interfaces. The SCEF provides access to network capabilities through homogenous application programming interfaces such as Network RESTful APIs. A RESTful API is an Application Program Interface (API) that uses Hypertext Transfer Protocol (HTTP) requests to GET, PUT, POST and DELETE data.

When needed, the SCEF supports mapping between information exchanged with Service Capability Server (SCS)/Application Server (AS), e.g. geographical identifiers, and information exchanged with internal Public Land Mobile Network (PLMN) functions, e.g. cell-Id, eNB-Identity, Tracking Area Identity (TAI), Multimedia Broadcast Multicast Service (MBMS) Service area ID (SAI) etc. This mapping is assumed to be provided by the SCEF based on local configuration data.

SCS/AS

The Service Capability Server/Application Server (SCS/AS) is the entity which connects application servers to the 3GPP network to enable them to communicate through specific 3GPP defined services with UEs used for the applications and with the SCEF in the Home Public Land Mobile Network (HPLMN). A HPLMN identifies the PLMN in which the subscribers profile is held. The SCS/AS offers capabilities for use by one or multiple application servers. The applications in the external network are hosted on one or more ASs. For example, these applications may be Machine Type Communication (MTC) applications.

SCS/AS may e.g. belong to an Over the Top (OTT) or 3rd party.

OTT refers to content providers that distribute streaming media as a standalone product directly to viewers over the Internet, bypassing telecommunications, multichannel television, and broadcast television platforms. OTT often relates to subscription-based video on demand services that offer access to film and television content including services that offer access to live streams over the public Internet, rather than a closed private networks. OTT services are normally accessed via websites on personal computers, and via applications on UEs such as smartphones and tablets, digital media players, or smart TV.

PGW-U

The Packet Data Network (PDN) Gateway (PGW) User plane function (PGW-U) provides the User Plane (UP) functionality of the PGW. The functionality of PGW-U is defined in 3GPP TS 23.214.

PGW-C

The PGW Control plane function (PGW-C) provides the functionality of the PGW as defined by 3GPP TS 23.401 and TS 23.402, and the Policy and Charging Enforcement Function (PCEF) as defined by the TS 23.203 except for the functions that are performed by the PGW-U.

T8 Interface

T8 is a reference point between the SCS/AS 10 and the SCEF 20, see FIG. 1. The T8 supports, amongst others, the Procedures for setting up an AS session with required QoS, from the SCS/AS towards the SCEF. It specifies RESTful APIs that allow the SCS/AS to access services and capabilities provided by 3GPP network entities and securely exposed by the SCEF.

Quality of service (QoS) refers to description or measurement of the overall performance of a service, such as a telephony or computer network or a cloud computing service, particularly the performance seen by the users of the network. To measure QoS, several related aspects of the network service are often considered, such as packet loss, bit rate, throughput, transmission delay, availability.

Procedures for setting up an AS session with required QoS.

An AS Session with QoS (AsSessionWithQoS) API is a RESTful API that allows the SCS/AS to set up a session with SCEF with required QoS based on the application and service requirement. The AsSessionWithQoS API defines a set of data models, resources and the related procedures for the creation and management of the AS sessions with required QoS.

CUPS

Control and User Plane Separation (CUPS) enables a flexible placement of the separated control plane and user plane functions for supporting diverse deployment scenarios, e.g. central or distributed user plane function.

In 5G, CUPS refers to Session Management Function (SMF) and User Plane Function (UPF) network functions and to the N4 reference point between them, which is based on Packet Forwarding Control Protocol (PFCP).

The SMF controls the packet processing in the UPF by establishing, modifying or deleting PFCP Session contexts and by provisioning, i.e. adding, modifying or deleting Packet Detection Rules (PDR)s, Forwarding Action Rules (FAR)s, QoS Enhancement Rules (QER)s, Usage Reporting Rules (URR)s and/or Buffering Action Rule (BAR) per PFCP session context, whereby a PFCP session context may correspond to an individual Protocol Data Unit (PDU) session or a standalone PFCP session not tied to any PDU session.

Each PDR comprises a Packet Detection Information (PDI), i.e. one or more match fields against which incoming packets are matched, and may be associated with rules providing a set of instructions to apply to packets matching the PDI.

4G and 5G QoS Models 4G and 5G QoS models are based on a static mapping between application traffic and the QoS. The UE receives from the RAN certain rules and/or packet filters, referred to as Traffic Flow Templates (TFTs) in 4G and QoS rules in 5G. The rules and/or packet filters will be used to map UL traffic to the different QoS mechanisms referred to as bearers in 4G and QoS flows in 5G. Then the UE tunnels or marks the UL PDUs using the Tunnel Endpoint Identifier (TEID) in 4G and QoS Flow Identity in 5G. For DL traffic the UP, PGW-U in 4G and UPF in 5G, maps the UP traffic to the corresponding bearers in 4G, or QoS flows in 5G, and tunnels or marks the traffic accordingly.

Existing Traffic Marking Solutions

Marking is a process of setting a tag or footprint in the protocol headers of a packet due to reflective QoS in DL, and due to new QoS framework in UL. There are at least two possibilities of marking.

One possibility of marking is to introduce this information in the packet directly sent by the end user. According to the layer where this tag is introduced, there are several technologies.

One example is in the Internet Protocol (IP) layer. In the past a field was defined in the IP header called Type of Service (TOS). That is defined in https://tools.ietf.org/html/rfc791. Nowadays TOS has been replaced by Differentiated Services Codepoint (DSCP). The DSCP is defined in 3GPP RFC 2474 and 2475. DSCP is a method that classifies the way an IP packet is queued while waiting to be forwarded within a router.

Another example is in the Transmission Control Protocol (TCP) layer. Here, the TCP header fields may be used to carry the footprint.

Another possibility of marking is introducing a new layer in the packet sent by the end user. Below are some common technologies.

One technology is Network Service Header (NSH), which may be used to add a header including the marking. The NSH may be added to encapsulated network packets or frames to create network service paths. In addition to path information, this header may also carry metadata used by network devices and/or network services. See https://tools.ietf.org/html/draft-quinn-nsh-01.

Another technology that is used is Virtual Local Area Network (VLAN) and Virtual Extensible Local Area Network (VXLAN). These technologies provide a tag in Layer 2, the data link layer. VXLAN is a framework for Overlaying Virtualized Layer 2 Networks over Layer 3 Networks. See https://tools.ietf.org/html/rfc7348.

Yet another technology that is used is Multiprotocol Layer Switching (MPLS) which provides specific labels in layer 2. MPLS directs data from one network node to the next based on short path labels rather than long network addresses, avoiding complex lookups in a routing table. The labels identify virtual links such as paths, between distant nodes rather than endpoints. MPLS encapsulates packets of various network protocols, hence its name multiprotocol, and supports a range of access technologies. See https://tools.ietf.org/html/rfc3031.

The current solution for an SCS/AS belonging to an OTT or 3rd party, to request a specific QoS to an operator's network such as 4G or 5G is the one described in the T8 interface between SCS/AS and SCEF, where the SCS/AS may request a certain QoS for a certain user equipment and application.

One of the problems of this solution is its slowness and lack of flexibility. This will be discussed more below.

SUMMARY

As mentioned above, a problem of the current solution is its slowness and lack of flexibility. This is since it is always needed that SCS/AS requests to SCEF to change the QoS. This requires a certain amount of time since the request lasts until the operator's network applies the new QoS. Some 4G and 5G use cases require to change Qos quickly as for example:

In 4G, video streaming use cases where the initial traffic of a video is sent with higher QoS than the rest to avoid reproduction start delays. This requires real-time QoS changes.

In 5G, automotive use cases that require the UE here represented by a car, to change QoS quickly for a certain UP traffic flow. E.g. when there is congestion or lack of coverage the car may want to request or assure resources for the critical traffic. In the same way, the car may want to change the QoS of a certain traffic type dynamically in real-time, e.g. when there is a car problem, the car may want to monitor the damaged systems in real time and send the related telemetry traffic with the highest QoS, while the regular telemetry traffic is sent with regular QoS and in a non-real time way.

Another problem of the current solution is that QoS requests are always done per UE and application. This is not optimal for requesting QoS for user groups. E.g. fleet-related Automotive use cases where a certain car manufacturer wants to request a certain QoS for the telemetry traffic of all its cars.

An object of embodiments herein is to improve the procedure for setting up an AS session with required QoS in a wireless communications network.

According to an aspect of embodiments herein, the object is achieved by a method performed by a policy node. The method is for handling Quality of Service, QoS, for data traffic between a User Equipment, UE, and an Application Server, AS, node associated with the UE in a wireless communications network. The policy node receives a first message from a control plane node serving the UE. The first message comprises information indicating one or more available marking types which a user plane node is capable of detecting in the data traffic. The policy node receives a second message from the AS node. The second message comprises information. The information indicates a number of marking types supported by both the UE and the AS node, a UE identifier identifying the UE and a list of QoS profiles associated with the UE. The policy node then decides a marking type and a marking value for each of the QoS profiles based on the information of the first message and the second message. The policy node transmits the decided marking type and marking value for each of the QoS profiles, in a third message to the AS node.

The policy node further receives a fourth message from the control plane node. The fourth message comprises a session establishment request with a UE identifier identifying the UE, which session establishment request relates to data traffic between the UE and the AS node. The policy node determines the decided marking type and marking value for each of the QoS profiles associated with the UE identifier. The policy node then transmits a fifth message towards the control plane node. The fifth message comprising a session establishment response for the UE identifier including the marking type and marking value decided for each QoS profile associated with the UE identifier.

According to a another aspect of embodiments herein, the object is achieved by a method performed by a user plane node, for handling Quality of Service, QoS, for data traffic between a User Equipment, UE, and an Application Server, AS, node associated with the UE in a wireless communications network. The user plane node transmits a first message towards a control plane node. The first message comprises information indicating one or more available marking types, which the user plane node 150 is capable of detecting in the data traffic. The user plane node further receives a sixth message from the control plane node. The sixth message comprises information partly based on the first message and indicating one or more Packet Detection Rules, PDR, with respective marking type and marking value and, per PDR, a QoS enforcement rule, QER, with QoS parameters for a corresponding QoS profile. The user plane node then associates each marking type and marking value with the corresponding QoS profile, based on the information in the sixth message. The user plane node receives data traffic from at least one of the UE and AS node. The data traffic indicates a marking type and is marked with a marking value to indicate a QoS to be applied. The user plane node detects the marking value for the marking type in the data traffic and determines the corresponding QoS profile associated with the detected marking type and marking value. The user plane node then enforces the determined corresponding QoS profile for the data traffic between the UE and the AS node.

According to a another aspect of embodiments herein, the object is achieved by a method performed by a control plane node, for handling Quality of Service, QoS, for data traffic between a User Equipment, UE, and an Application Server, AS, node associated with the UE in a wireless communications network. The control plane node receives a first message from a user plane node. The first message comprises information indicating one or more available marking types, which the user plane node is capable of detecting in the data traffic. The control plane node transmits towards a policy node, the first message comprising the information indicating the one or more available marking types. The control plane node further transmits a fourth message towards the policy node. The fourth message comprises a session establishment request with a UE identifier identifying the UE. The session establishment request relates to the data traffic between the UE and the AS node. The control plane node receives a fifth message from the policy node. The fifth message comprises a session establishment response for the UE identifier including a marking type and marking value decided for each QoS profile associated with the UE identifier, partly based on the information in the first message.

The control plane node transmits a sixth message towards the user plane node. The sixth message comprises information indicating one or more Packet Detection Rules, PDR, with respective marking type and marking value and, per PDR, a QoS Enforcement Rule, QER, with QoS parameters for a corresponding QoS profile, based on the information of the fifth message.

According to a another aspect of embodiments herein, the object is achieved by policy node. The policy node is configured to handle Quality of Service, QoS, for data traffic between a User Equipment, UE, and an Application Server, AS, node associated with the UE in a wireless communications network. The policy node is further configured to:

Receive from a control plane node serving the UE, a first message adapted to comprise information indicating one or more available marking types, which a user plane node is capable of detecting in the data traffic, receive from the AS node, a second message adapted to comprise information indicating a number of marking types supported by both the UE and the AS node, a UE identifier identifying the UE and a list of QoS profiles associated with the UE, decide a marking type and a marking value for each of the QoS profiles based on the information of the first message and the second message, transmit in a third message to the AS node, the decided marking type and marking value for each of the QoS profiles, receive from the control plane node, a fourth message adapted to comprise a session establishment request with a UE identifier identifying the UE, which session establishment request is adapted to be related to data traffic between the UE and the AS node, determine the decided marking type and marking value for each of the QoS profiles associated with the UE identifier, and transmit towards the control plane node, a fifth message adapted to comprise a session establishment response for the UE identifier including the marking type and marking value decided for each QoS profile associated with the UE identifier.

According to a another aspect of embodiments herein, the object is achieved by a user plane node. The user plane node is configured to handle Quality of Service, QoS, for data traffic between a User Equipment, UE, and an Application Server, AS, node associated with the UE in a wireless communications network. The user plane node is further configured to:

Transmit towards a control plane node, a first message adapted to comprise information indicating one or more available marking types which the user plane node is capable of detecting in the data traffic;

receive from the control plane node, a sixth message adapted to comprise information partly based on the first message and indicating one or more Packet Detection Rules, PDR, with respective marking type and marking value and, per PDR, a QoS enforcement rule, QER, with QoS parameters for a corresponding QoS profile;

associate each marking type and marking value with the corresponding QoS profile, based on the sixth message, receive, from at least one of the UE and AS node, data traffic indicating a marking type and marked with a marking value to indicate a QoS to be applied, detect the marking value for the marking type in the data traffic, determine a corresponding QoS profile associated with the detected marking type and marking value, and enforce the determined corresponding QoS profile for the data traffic between the UE 120 and the AS node.

According to a another aspect of embodiments herein, the object is achieved by a control plane node. The control plane node is configured to handle Quality of Service, QoS, for data traffic between a User Equipment, UE, and an Application Server, AS, node associated with the UE in a wireless communications network. The control plane node is further configured to:

Receive from a user plane node, a first message adapted to comprise information indicating one or more available marking types, which the user plane node is capable of detecting in the data traffic, transmit towards a policy node the first message adapted to comprise information indicating the one or more available marking types, transmit towards the policy node, a fourth message adapted to comprise a session establishment request with a UE identifier identifying the UE, which session establishment request is adapted to relate to the data traffic between the UE and the AS node, receive from the policy node, a fifth message adapted to comprise a session establishment response for the UE identifier including a marking type and marking value decided for each QoS profile associated with the UE identifier, partly based on the information in the first message, and transmit towards the user plane node, a sixth message adapted to comprise information indicating one or more Packet Detection Rules, PDR, with respective marking type and marking value and, per PDR, a QoS Enforcement Rule, QER, with QoS parameters for a corresponding QoS profile based on the information of the fifth message.

An advantage of embodiments herein is that they allow the UE and the AS node to select and apply a certain QoS to the data traffic flow in a dynamic, quick and independent way without the need of interacting with the operator's network at the time they want to change the QoS for a certain application.

BRIEF DESCRIPTION OF THE DRAWINGS

Examples of embodiments herein are described in more detail with reference to attached drawings in which:

FIGS. 14 to 17 are flowcharts illustrating methods implemented in a communication system including a host computer, a base station and a user equipment.

DETAILED DESCRIPTION

Some embodiments herein are aimed to overcome the drawbacks mentioned above and provides e.g. for a method for enabling a UE or AS to select a QoS to be applied for an application. In an example of this method, an SCS/AS and an SCEF agree on a marking type and marking value associated to a certain QoS for a certain users' group. Then, the UE or AS mark the traffic according to the QoS they want to apply for an application.

Figure 1:
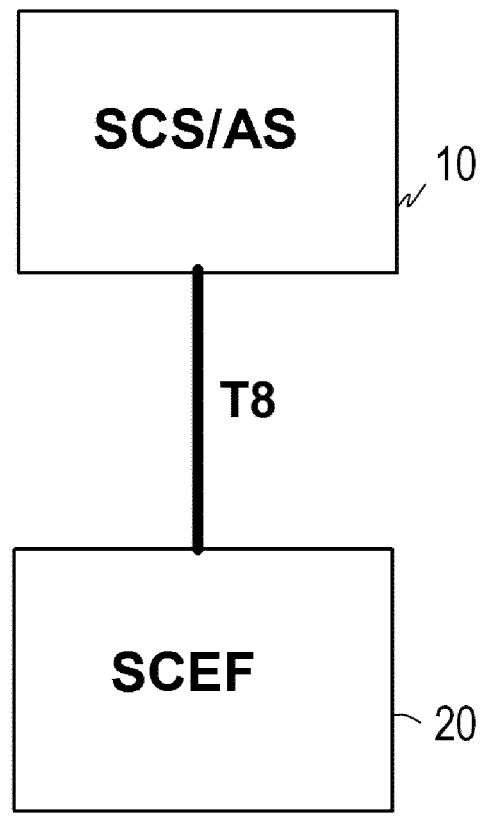
FIG. 1 is a schematic block diagram illustrating prior art.
Figure 2:
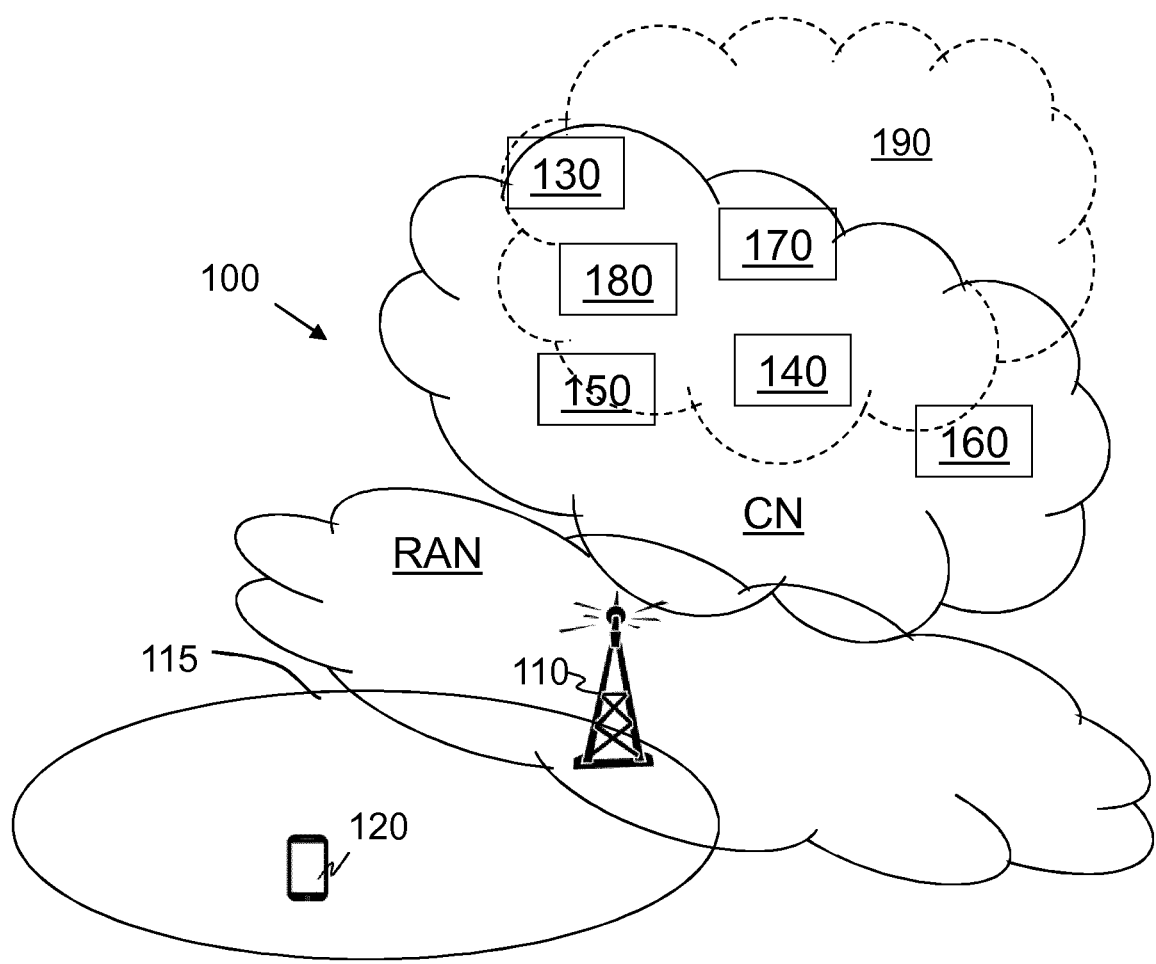
FIG. 2 is a schematic block diagram illustrating embodiments of a wireless communications network.

FIG. 2 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, Wi-Fi, Long Term Evolution (LTE), LTE-Advanced, Wideband Code Division Multiple Access (WCDMA), Global System for Mobile communications/ enhanced Data rate for GSM Evolution (GSM/EDGE), Worldwide Interoperability for Microwave Access (WiMax), or Ultra Mobile Broadband (UMB), just to mention a few possible implementations.

Wireless devices such as e.g. a UE 120 operate in the wireless communications network 100. The UE 120 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. a network node 110, one or more Access Networks (AN), e.g. a RAN, to one or more core networks (CN). It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a car or any small base station communicating within a cell 115 provided by the network node 110.

The network node 110 is a radio node and may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point or an Access Point Station (AP STA), an access controller, or any other network unit capable of communicating with a UE within the cell 115 served by the network node 110 depending e.g. on the radio access technology and terminology used. The network node 110 may be referred to as a serving radio network node and communicates with a UE 120 with Downlink (DL) transmissions to the UE 120 and Uplink (UL) transmissions from the UE 120.

Among others, one or more of the following network nodes operate in the CN the wireless communications network 100.

A policy node 130 such as e.g. a PCRF node in 4G or a PCF node in 5G.

A control plane node 140 such as e.g. a PGW-C node in 4G or a SMF node in 5G.

A user plane node 150 such as e.g. a PGW-U node in 4G, UPF node in 5G.

An AS node 160 such as e.g. a Service Capability Server and/or Application Server also referred to as SCS/AS. The AS node 160 such as the SCS/AS may e.g. belong to an Over the Top (OTT) or 3rd party.

A subscriber database node 170 such as e.g. a Subscriber Profile Repository (SPR), Unified Data Repository (UDR), and/or Home Subscriber Server (HSS).

A service capability exposure node 180 such as e.g. a Network Exposure Function (NEF) in 4G or a SCEF in 5G.

Methods according to embodiments herein are performed by the policy node 130, the control plane node 140, and the user plane node 150. These nodes may be Distributed Nodes and functionality, e.g. comprised in a cloud 190 as shown in FIG. 2, may be used for performing or partly performing the methods.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner.

Some relevant procedures for embodiments herein are e.g. the procedures for setting up an AS session with required QoS.

Some relevant fields for embodiments herein e.g. comprise zero, one or more QERs, which comprises instructions related to the QoS enforcement of the data traffic.

In 4G, Sxb is the reference point between PGW-C and PGW-U. In this document, this reference point is referred to simply as Sx. It is specified in 3GPP TS 29.244.

Some example embodiments herein comprises a method based on OTT-operator collaboration and traffic marking to allow the UE 120 and the AS node 160 to select and apply a certain QoS to an application in a dynamic, quick and independent way.

Embodiments herein provide methods that allows to overcome the above problems enabling the UE 120 or AS node 160 to select the QoS that it wants to apply fora certain application in a dynamic and independent way, i.e. the UE or AS node may change the QoS of a certain application in real time without the need of interacting with the operator to set QoS agreements when the UE or AS node want to change the QoS.

In some embodiments SCS/AS and SCEF to agree on the marking type and marking value that is associated to a certain QoS for a certain user group. Once this agreement takes place, the UE and AS node can mark the traffic according to the QoS they want to apply to an application in each moment in an independent way.

Figure 3:
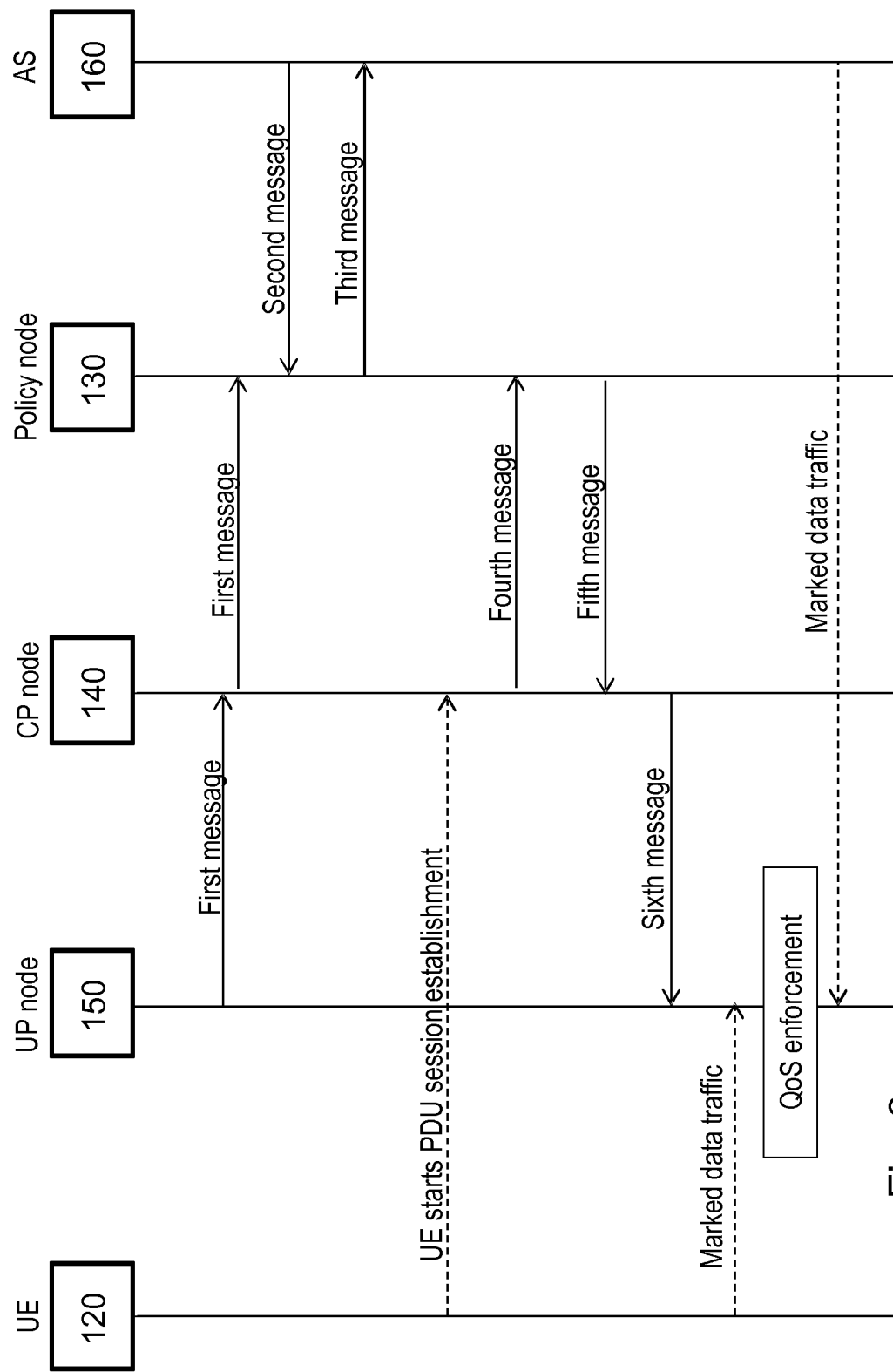
FIG. 3 is a sequence diagram illustrating embodiments of a method.

To make it easier to keep track of the different messages, the relevant messages relating to embodiments herein has been named as first to sixth messages out of all the messages that are transmitted in the procedure of handling the QoS, are depicted in a sequence diagram of FIG. 3. These messages comprises:

A first message comprising information indicating one or more available marking types, which the user plane node 150 is capable of detecting in the data traffic. The first message is sent from the user plane (UP) node 150 to the control plane (CP) node 140, and further on to the policy node 130.

A second message comprising information indicating a number of marking types supported by both the UE 120 and the AS node 160, a UE identifier identifying the UE 120 and a list of QoS profiles associated with the UE 120. The second message is sent from the AS node 160 to the policy node 130.

A third message indicating the decided marking type and marking value for each of the QoS profiles. The third message is sent from the policy node 130 to the AS node 160.

A fourth message comprising a session establishment request with a UE identifier identifying the UE 120. The session establishment request relates to data traffic between the UE 120 and the AS node 160. The fourth message is sent from the CP node 140 to the policy node 130.

A fifth message comprising a session establishment response for the UE identifier including the marking type and marking value decided for each QoS profile associated with the UE identifier. The fifth message is sent from the policy node 130 to the CP node 140.

A sixth message comprising information partly based on the first message and indicating one or more PDR with respective marking type and marking value and, per PDR, a QER with QoS parameters for a corresponding QoS profile. The sixth message is sent from CP node 140 to the UP node 150.

An example of the provided method is based on the following steps, both for 4G and 5G, (4G/5G):

The user plane node 150 (PGW-U/UPF) associates to the control plane node 150 (PGW-C/SMF) indicating the QoS markings that it supports, i.e. the ones they can detect to enforce the QoS. In turn the control plane node 150 (PGW-C/SMF) notifies the policy node 130 (PCRF/PCF) about the supported marking types. This is sent in the first message.

The AS node 160 (SCS/AS) requests a QoS marking and provides to the service capability exposure node 180 (SCEF/NEF) and further on to the policy node 130, the target user group, a list of the supported marking types, e.g. DSCP, NSH, QFI, . . . ; by both the UE 120 and the AS node 160 (SCS/AS), and a list of the requested QoS profiles. This is sent in the second message. The policy node 130 (PCRF/PCF), e.g. in the operator's network then decides the marking type and marking value for each of the QoS profiles and sends this information back to the AS node 160 (SCS/AS). This is sent in the third message.

The UE 120 is configured with the marking types and marking values associated to each QoS.

When the UE 120 attaches to the mobile network (in 4G) or when the UE triggers a PDU session establishment (in 5G), in a session establishment request to the policy node 130, sent in the fourth message, the control plane node 150 (PGW-C/SMF) gets from to the policy node 130 (PCRF/PCF) the different marking types, marking values and QoS profiles to apply to the user. This is received in the fifth message.

Then the control plane node 150 (PGW-C/SMF) configures the user plane node 150 (PGW-U/UPF) in the sixth message, to detect the marking types and marking values, e.g. by including the marking types and marking values in the PDRs, and to enforce the associated QoS, e.g. by including the QoS parameters in the QERs.

Finally, both the UE 120 and the AS node 160 mark the traffic according to the QoS they want to apply to the different applications. Then the user plane node 150 (PGW-U/UPF) detects the traffic markings and enforce the corresponding QoS.

Embodiments herein comprises advantages e.g. as listed below:

They allow the UE 120 and the AS node 160 to select and apply a certain QoS to a UP traffic flow in a dynamic, quick and independent way without the need of interacting with the operator's network at the time they want to change the QoS for a certain application.

The AS node 160 requests the desired QoS, while policy node 130 decides the marking types and marking values to apply. This allows the operator's network to control the marking and manage it in a proprietary way.

They allows to associate QoS profiles to user groups, while allowing the different users within the user group to have a different QoS at the same time.

Figure 4:
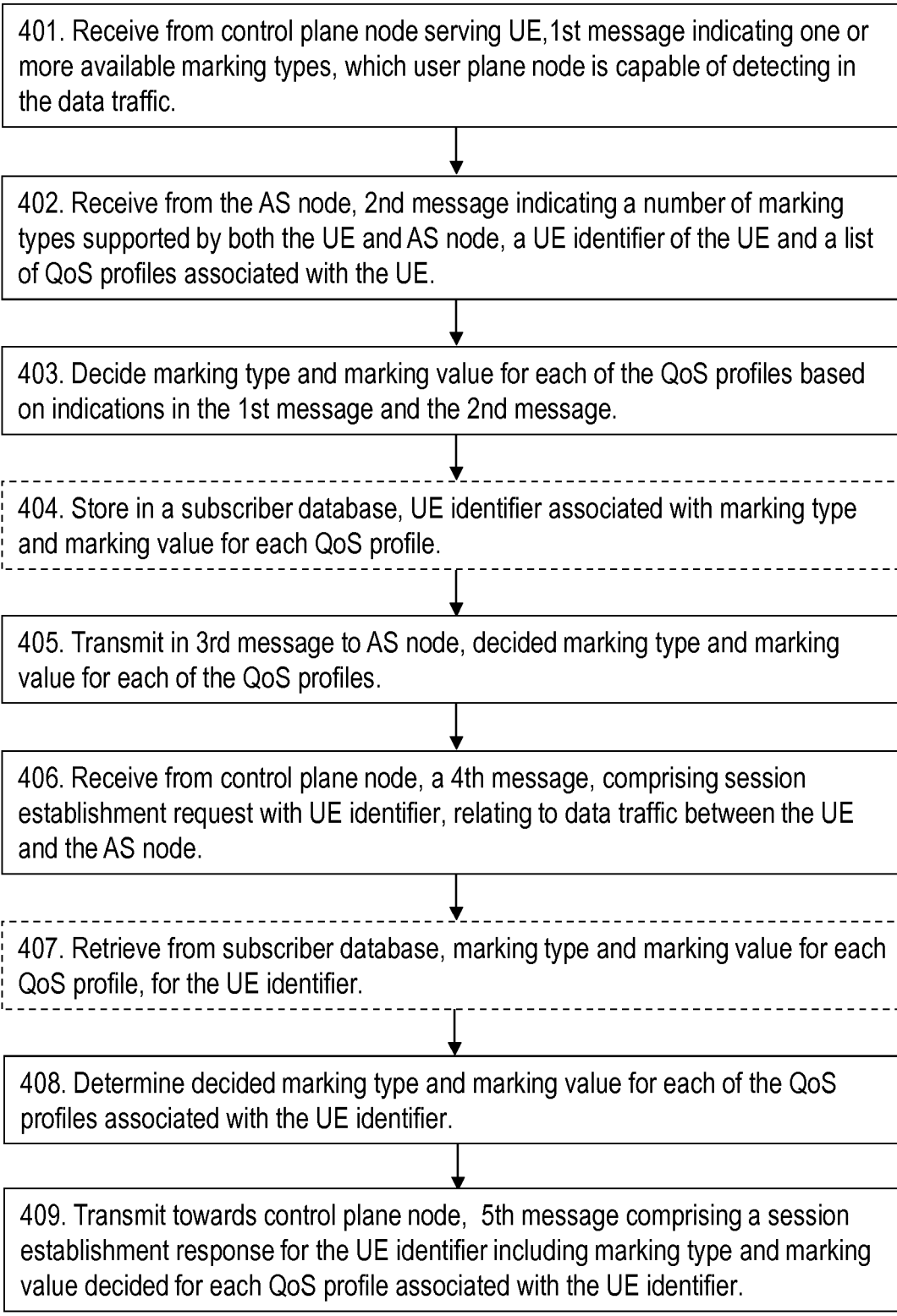
FIG. 4 is a flowchart depicting embodiments of a method in a policy node.
Figure 5:
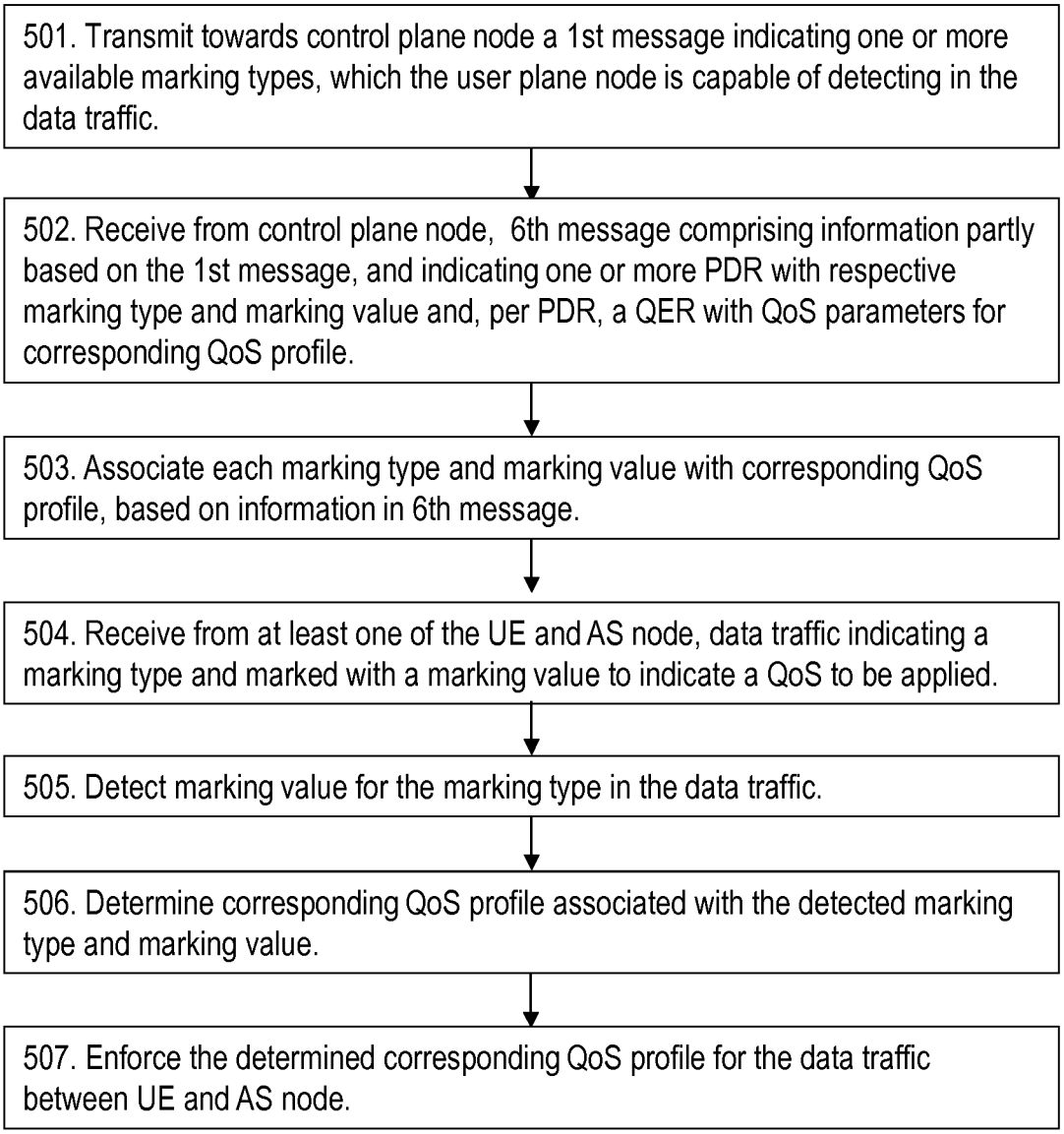
FIG. 5 is a flowchart depicting embodiments of a method in a user plane node.
Figure 6:
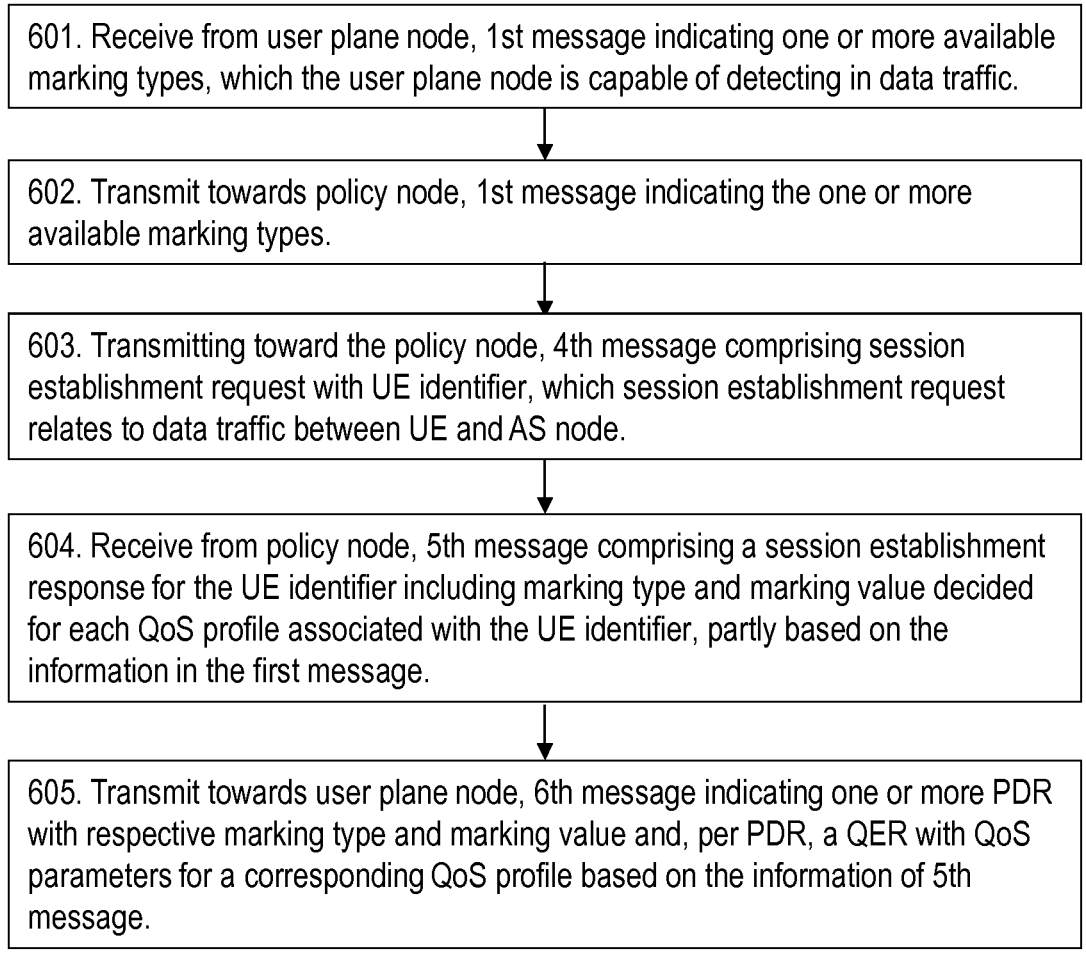
FIG. 6 is a flowchart depicting embodiments of a method in a control plane node.

The method according to embodiments will now be described, first from the view of the policy node 130 together with FIG. 4, then from the view of the user plane node 150 together with FIG. 5, and then from the view of the control plane node 140 together with FIG. 6.

Example embodiments of a method performed by the policy node 130, for handling QoS for data traffic between the UE 120 and the AS node 160 associated with the UE 120 in the wireless communications network 100, will now be described with reference to a flowchart depicted in FIG. 4.

The method comprises the following actions, which actions may be taken in any suitable order. Actions that are optional are presented in dashed boxes in FIG. 4.

Action 401

According to embodiments herein, a user plane node 150 serving the UE 120 need to be capable of detecting marking types in the data traffic. The user plane node 150 is only capable to detect some marking types. Therefore the policy node 130 need to know which marking types the user plane node 150 is capable to detect in the data traffic. This will be used as a basis for later on deciding marking types supported by both the UE 120 and the AS node 160. Thus the policy node 130 receives a first message from the control plane node 140 serving the UE 120. The first message comprises information indicating one or more available marking types which the user plane node 150 is capable of detecting in the data traffic. The user plane node 150 has transmitted this information in the first message towards the control plane node 140, and the control plane node 140 then forwards this information to the policy node 130.

Action 402

To be able to later on decide a marking type and a marking value for each of the QoS profiles, the policy node 130 further receives a second message from the AS node 160. The second message comprises information that indicates a number of marking types supported by both the UE 120 and the AS node 160, a UE identifier identifying the UE 120 and a list of QoS profiles associated with the UE 120.

Action 403

The policy node 130 decides the marking type and a marking value for each of the QoS profiles based on the information of the first message and the second message.

Action 404

In some embodiments, the policy node 130 may store in a subscriber database, the UE identifier associated with the marking type and marking value for each QoS profile. This may be used to be retrieved later on in the process.

Action 405

The policy node 130 will then inform the AS node 160 about the decision, so that it knows which marking type and a marking value for each of the QoS profiles that may be used by AS node 160 for data traffic to the UE 120. The policy node 130 thus transmits in a third message to the AS node 160, the decided marking type and marking value for each of the QoS profiles.

Action 406

The UE 120 starts a PDU session establishment for data traffic between the UE 120 and the AS node 160.

The policy node 130 receives from the control plane node 140, a fourth message comprising a session establishment request with a UE identifier identifying the UE 120, which session establishment request relates to data traffic between the UE 120 and the AS node 160. The UE identifier will be used to retrieve a corresponding marking type and marking value for each QoS profile for the specific UE identifier.

Action 407

If marking type and marking value for each QoS profile for different UE identifiers are saved in the subscriber database, the policy node 130 may retrieve the marking type and marking value for each QoS profile from the subscriber database for the specific UE identifier. Thus, in some embodiments, the policy node 130 retrieves from the subscriber database, the marking type and marking value for each QoS profile, for the UE identifier.

Action 408

The policy node 130 determines the decided marking type and marking value for each of the QoS profiles associated with the UE identifier. In this respect, if the optional actions 404 and 407 are carried out, the determination is based on the retrieval of the marking type and marking value for each QoS profile, for the UE identifier.

In some embodiments, the UE identifier identifying the UE 120, received in the second message, is represented by a group identifier identifying a user group comprising other UEs and the UE 120. In these embodiments the decided marking type and marking value for each of the QoS profiles associated with the UE identifier may be determined for each of the QoS profiles associated with the group identifier, by the policy node 130, to all the UEs within the user group.

Action 409

The control plane node 140 is then informed. Thus the policy node 130 transmits towards the control plane node 140, a fifth message comprising a session establishment response for the UE identifier including the marking type and marking value decided for each QoS profile associated with the UE identifier.

The method according to embodiments will now be described from the view of the user plane node 150 together with FIG. 5.

Example embodiments of a method performed by a user plane node 150, for handling QoS, for data traffic between the UE 120 and the AS node 160 associated with the UE 120 in a wireless communications network 100, will now be described with reference to a flowchart depicted in FIG. 5.

The method comprises the following actions, which actions may be taken in any suitable order.

Action 501

The user plane node 150 transmits towards the control plane node 140 the first message comprising information indicating one or more available marking types which the user plane node 150 is capable of detecting in the data traffic. The control plane node 140 will then forward the information in the first message to the policy node 130 as mentioned above.

Action 502

The UE 120 has started a PDU session establishment for data traffic between the UE 120 and the AS node 160, and the user plane node 150 receives a sixth message from the control plane node 140. The sixth message comprises information partly based on the first message and indicating one or more PDR with respective marking type and marking value and, per PDR, a QER with QoS parameters for a corresponding QoS profile. This information will be used for detecting what packets carry the marking type and marking value and apply the corresponding QoS enforcements to them.

Action 503

The user plane node 150 associates each marking type and marking value with the corresponding QoS profile, based on the information in the sixth message. This is performed for enforcing the corresponding QoS parameters to the packets carrying the marking type and marking value.

Action 504

The user plane node 150 receives from at least one of the UE 120 and AS node 160, data traffic indicating a marking type and marked with a marking value to indicate a QoS to be applied. This means that the user plane node 150 may receive the data traffic from the UE 120 in some cases and from the AS node 160 in other cases depending on wherefrom the data traffic is originating.

Action 505

The user plane node 150 then detects the marking value for the marking type in the data traffic.

Action 506

Now the QoS profile will be determined to be enforces in the data traffic. The user plane node 150 finds the QoS profile that corresponds to the detected marking type and marking value among different QoS profiles associated with different marking types and marking values. The user plane node 150 determines the corresponding QoS profile associated with the detected marking type and marking value. This may be performed by taking the QoS parameters defined in the QoS profile and executing the corresponding processes in the user plane node to enforce them.

Action 507

The user plane node 150 then enforces the determined corresponding QoS profile for the data traffic between the UE 120 and the AS node 160.

The method according to embodiments will now be described, from the view of the control plane node 140 together with FIG. 6.

Example embodiments of a method performed by the control plane node 140, for handling QoS for data traffic between the UE 120 and the AS node 160 associated with the UE 120 in a wireless communications network 100 will now be described with reference to a flowchart depicted in FIG. 6.

The method comprises the following actions, which actions may be taken in any suitable order.

Action 601

As mentioned above, the control plane node 140 receives the information of the first message from user plane node 150 and forwards this information to the policy node 130.

The control plane node 140 receives from a user plane node 150, a first message comprising information indicating one or more available marking types, which the user plane node 150 is capable of detecting in the data traffic.

Action 602

The control plane node 140 transmits towards a policy node 130 the first message comprising information indicating the one or more available marking types.

Action 603

The UE 120 has started a PDU session establishment for data traffic between the UE 120 and the AS node 160, and the control plane node 140 transmits towards the policy node 130, a fourth message comprising a session establishment request with a UE identifier identifying the UE 120. The session establishment request relates to the data traffic between the UE 120 and the AS node 160.

Action 604

The control plane node 140 receives from the policy node 130, a fifth message comprising a session establishment response for the UE identifier including a marking type and marking value decided for each QoS profile associated with the UE identifier, partly based on the information in the first message.

Action 605

The control plane node 140 transmits towards the user plane node 150, a sixth message comprising information indicating one or more PDR, with respective marking type and marking value and, per PDR, a QER with QoS parameters for a corresponding QoS profile based on the information of the fifth message.

Embodiments herein such as mentioned above will now be further described and exemplified. The text below is applicable to and may be combined with any suitable embodiment described above.

An example method summarizing the above methods may comprise one or more of the following actions:

Receiving, at a control plane node 140 (PGW-C, SMF) from a user plane node 150 (PGW-U, UPF), a first set of supported marking types;

Notifying, from the control plane node 140 to a policy node 130 (PCRF, PCF), of the first set of supported marking types;

Transmitting, from an SCS/AS such as the AS node 160 towards the policy node 130 via an SCEF node 180, a QoS marking request with a group identifier, a second set of supported marking types and a list of QoS profiles associated with the group identifier;

Determining, at the policy node 130, a marking type and a marking value for each QoS profile, based on the first set of supported marking types and the second set of supported marking types;

Transmitting, from the policy node 130 towards the SCS/AS such as the AS node 160 via the SCEF node 180, a QoS marking response with the marking type and the marking value determined for each QoS profile; Configuring, from the SCS/AS such as the AS node 160, the UE 120 with the marking type and marking value determined for each QoS profile;

Receiving, at the control plane node 140 upon the UE 120 triggering an attachment procedure, a bearer establishment request;

Transmitting, from the control plane node 140 to the policy node 130, a session establishment request with a UE identifier;

Determining, at the policy node 130, the group identifier corresponding to the UE identifier;

Receiving, at the control plane node 140 from the policy node 130, a session establishment response for the UE identifier including the marking type and marking value determined for each QoS profile associated with the group identifier;

Transmitting, from the control plane node 140 to a user plane node 150 that supports the marking types received from the policy node 130, one or more PDR with marking type and marking value and one or more QER with QoS parameters for corresponding QoS profile;

Receiving, at the user plane node 150 from the UE 120 or the SCS/AS such as the AS node 160, traffic marked with a marking type to indicate a QoS to be applied; and Detecting, at the user plane node 150, the marking type and enforcing the associated QoS profile.

Advantageously, the method may further comprise storing, from the policy node towards a subscriber database (SPR, UDR, HSS), the group identifier associated with the marking type and marking value for each QoS profile; and retrieving, at the policy node from the subscriber database, the marking type and marking value for each QoS profile, for the UE identifier.

FIG. 7 *a* steps 1-14, b steps 15-25 and c steps 26-31 depicts examples of detailed steps for a 4G implementation according to embodiments herein. In the figure the policy node 130 is referred to as PCRF 130, the control plane node 140 is referred to as a PGW-C 140, the user plane node 150 is referred to as a PGW-U 150, the AS node 160 is referred to as SCS/AS 160, the subscriber database node 170 is referred to as UDR 170, and the service capability exposure node 180 is referred to as SCEF 180.

The steps may be taken in any suitable order. Some of the steps are new according to embodiments herein and are marked so, and some steps are performed according prior art.

Figure 7A:
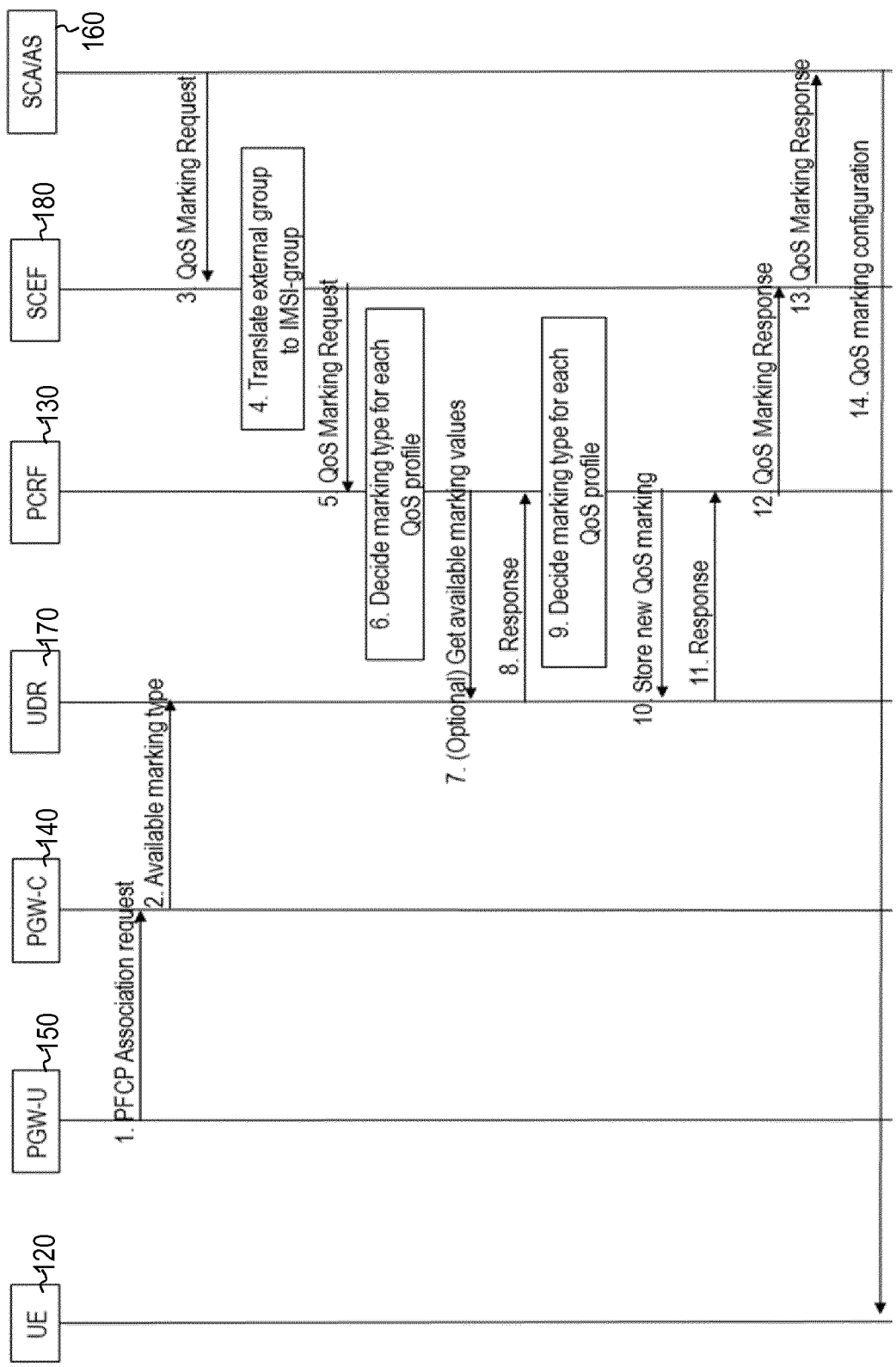
FIGS. 7 *a, b* and *c* are sequence diagrams depicting embodiments of a method.

FIG. 7*a* depicts steps 1-14.

Step 1. The PGW-U 150 sends to the PGW-C 140 a PFCP association request message including the capability QoS marking support. This also includes the marking-types that PGW-U 150 supports as parameters. This step is an action according to embodiments herein. This relates to the first message mentioned above.

Step 2. The PGW-C 140 sends to the PCRF 130 a notification including the available marking types notified by the different PGW-Us. This step is an action according to embodiments herein. This also relates to the first message mentioned above.

Step 3. SCS/AS 160 in OTT domain sends to the SCEF 180 a QoS marking request message including External group identifier, supported marking types, list and QoS profile. This step is an action according to embodiments herein. This relates to the second message mentioned above.

Note: The External group identifier and the set of UEs that belong to it are assumed to be known in advance by the operator and OTT.

Step 4. The SCEF 180 translates the External user group to an internal International Mobile Subscriber Identity (IMSI)-group handled by an operator.

Step 5. The SCEF 180 sends to the PCRF 130, the QoS marking request including IMSI-group, supported marking types, list such as QoS profile. This step is an action according to embodiments herein. This also relates to the second message mentioned above.

Step 6. PCRF 130 decides the marking type for each QoS profile based on the available marking types sent by PGW-C 140 and SCS/AS 160. This step is an action according to embodiments herein.

PCRF 130 may select a marking type that is supported by both the PGW-U 150 and UE 120 and/or AS 160. In case there are several marking types supported by both the PGW-U 150 and UE 120 and/or AS 160, PCRF 130 may select the marking type based on preconfigured preferences.

Step 7. If needed, the PCRF 130 may request to UDR 170 the available marking values that the PCRF 130 may use to choose a marking value. This step is an action according to embodiments herein The UDR 170 may determine the available marking values based on a preconfigured range of possible values (per marking-type). The available marking values are the ones that are not assigned to any QoS profile yet.

Step 8. If the previous step takes place, the UDR 170 responds with the available marking values. This step is an action according to embodiments herein.

Step 9. The PCRF 130 decides the marking value for each QoS profile based on the available marking values received from the UDR 170. This step is an action according to embodiments herein.

Optionally, if steps 7 and 8 do not take place, The PCRF 130 may select one marking value by itself e.g. from a preconfigured range of possible values per marking-type, and check with UDR 170 if that marking value is already assigned. If it is already assigned, the PCRF 130 may select another marking value and check with UDR 170 again.

Step 10. The PCRF 130 sends to the UDR 170, the IMSI-group and the list of tuples such as marking-type, marking-value, and QoS profile. UDR 170 store the information. This step is an action according to embodiments herein.

Another possibility is that the PCRF 130 sends to the UDR 170 the marking-types and QoS profiles, and the UDR 170 assigns the marking values e.g. from a preconfigured range of possible values per marking-type. In this case steps 7 and 8 do not take place.

Step 11. The UDR 170 responds with an acknowledgement (ack).

Step 12. The PCRF 130 sends to the SCEF 180 a QoS marking response message including the list of tuples such as marking-type, marking-value, and QoS profile. This step is an action according to embodiments herein. This relates to the third message mentioned above.

Step 13. The SCEF 180 sends to the SCS/AS 160 a QoS marking response message including the list of tuples such as marking-type, marking-value, and QoS profile. This step is an action according to embodiments herein. This also relates to the third message mentioned above.

Step 14. The OTT such as the AS 160 configures the QoS marking in the UE 120. This step is an action according to embodiments herein. It can follow two main approaches:
 a. The OTT such as the AS 160 configures the UE 120 with the list of tuples such as e.g. Traffic-type, marking-type, and marking-value.
 b. The OTT such as the AS 160 configures the UE 120 with the list of tuples such as e.g. QoS profile, marking-type, and marking-value.

Figure 7B:
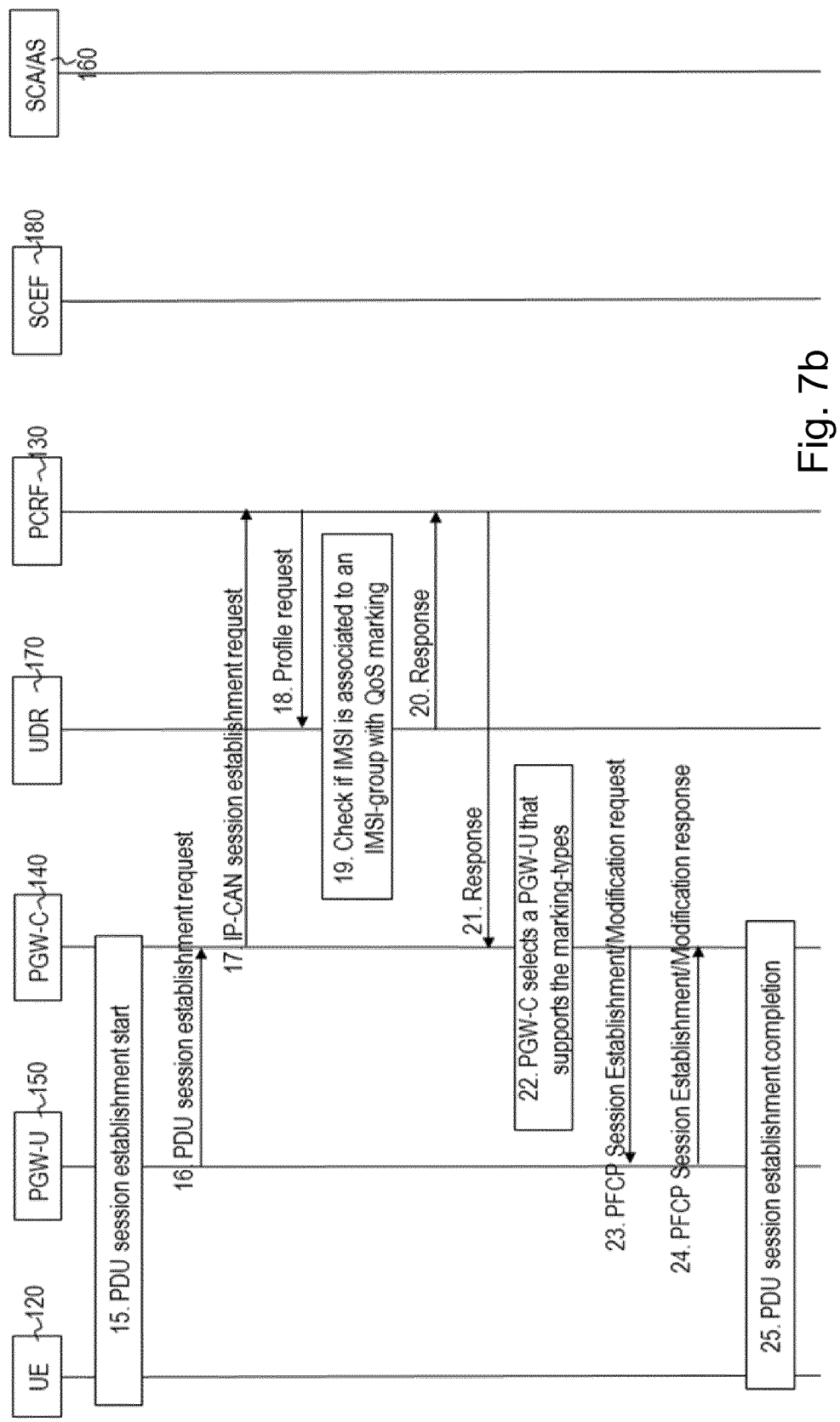

FIG. 7*b* depicts steps 15-25.

Step 15. The UE 120 triggers the attachment procedure with the mobile network.

Step 16. The PGW-C 140 receives an Establish Internet Protocol Connectivity Access Network (IP-CAN) bearer Request.

Step 17. The PGW-C 140 sends to the PCRF 130 an IP-CAN session establishment request message including the IMSI. This relates to the fourth message mentioned above.

Step 18. The PCRF 130 sends to the UDR 170 a message to get the user profile including the IMSI.

Step 19. The UDR 170 checks if the IMSI is associated to an IMSI-group with QoS marking. This step is an action according to embodiments herein.

Step 20. The UDR 170 sends to the PCRF 130, the list of tuples such as Marking type, marking value, and QoS profile, for the user such as the UE 120. This step is an action according to embodiments herein.

Step 21. The PCRF 130 sends to the PGW-C 140 an IP-CAN session establishment response message with the Policy and Charging Control (PCC) rules including the list of tuples such as marking type, marking value, and QoS profile. This step is an action according to embodiments herein. This relates to the fifth message mentioned above.

Step 22. The PGW-C 140 selects a PGW-U such as the PGW-U 150 that supports the marking-types sent by PCRF 130. This step is an action according to embodiments herein.

Step 23. The PGW-C 140 sends to the PGW-U 150, a PFCP Session Establishment request with the PDRs including marking type and marking value, and QERs including the QoS parameters. This step is an action according to embodiments herein. This relates to the sixth message mentioned above.

Note: the PFCP Session Modification procedure would include the same parameters.

Step 24. The PGW-U 150 responds with a PFCP Session Establishment response.

Step 25. The attachment procedure is completed.

Figure 7C:
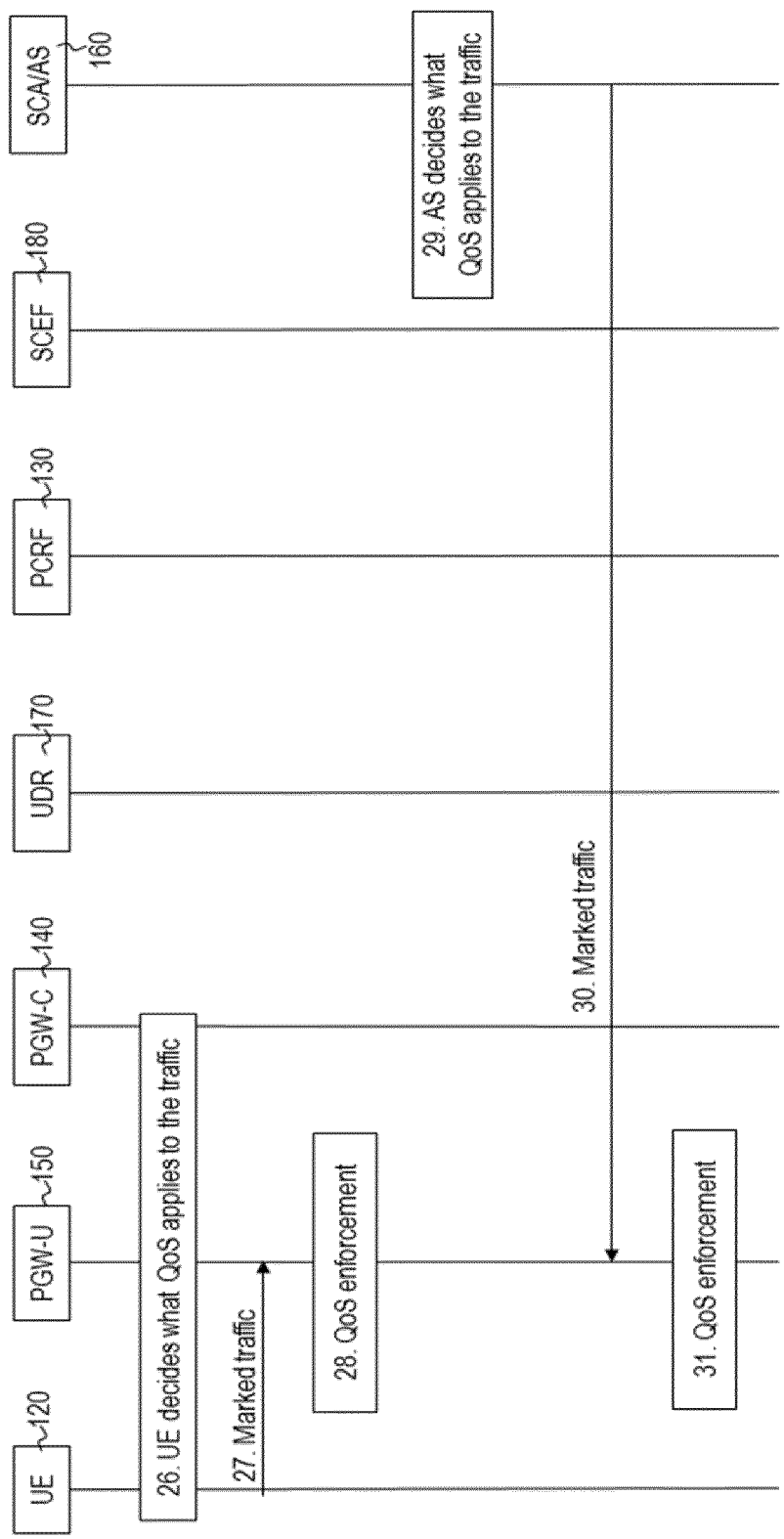

FIG. 7*c* depicts steps 26-31.

Step 26. When the UE 120 wants to send UL data traffic, it decides what QoS applies to the traffic and applies the corresponding marking to the UL PDUs. This step is an action according to embodiments herein.

Step 27. The marked traffic reaches PGW-U 150.

Step 28. The PGW-U 150 inspects the traffic, detects the marking and enforces the configured QoS associated to the marking. This step is an action according to embodiments herein.

Step 29. In the same way, when the AS 160 wants to send DL traffic, it decides what QoS applies to the traffic and applies the corresponding marking to the DL PDUs. This step is an action according to embodiments herein.

Step 30. The marked traffic reaches PGW-U 150.

Step 31. The PGW-U 150 inspects the traffic, detects the marking and enforces the configured QoS associated to the marking. This step is an action according to embodiments herein.

Figure 8A:
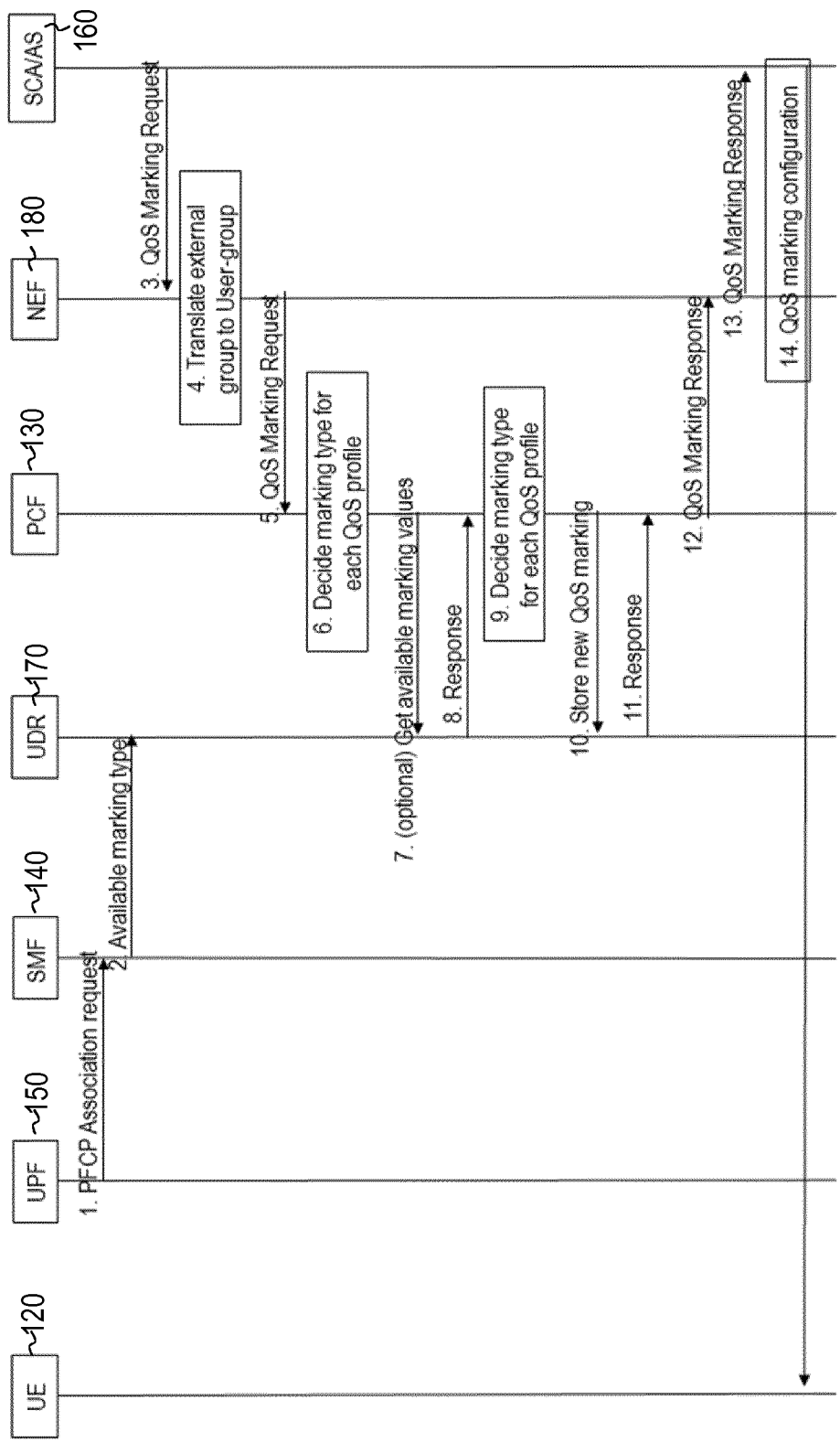
FIGS. 8 *a, b* and *c* are sequence diagrams depicting embodiments of a method.
Figure 8B:
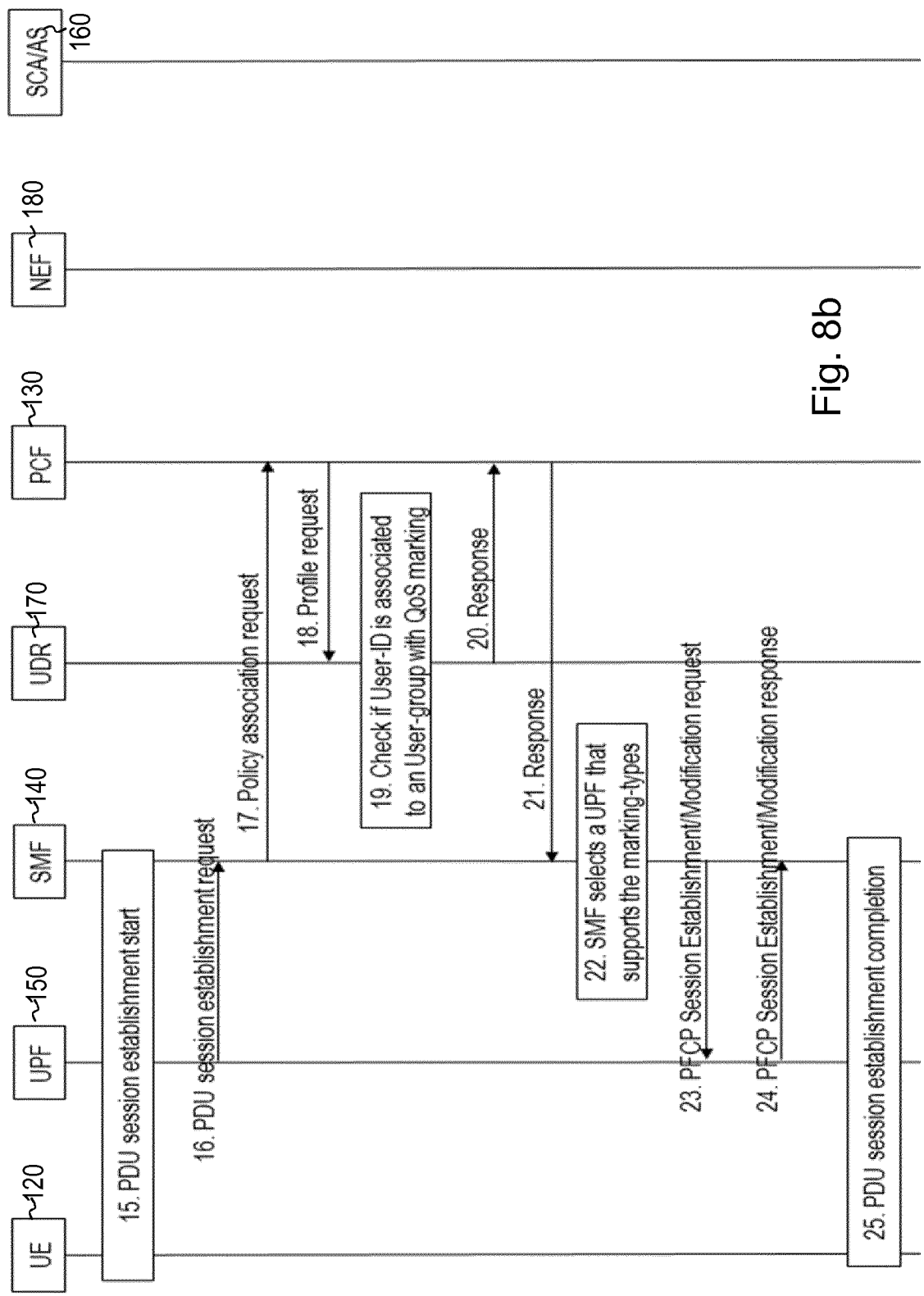
Figure 8C:
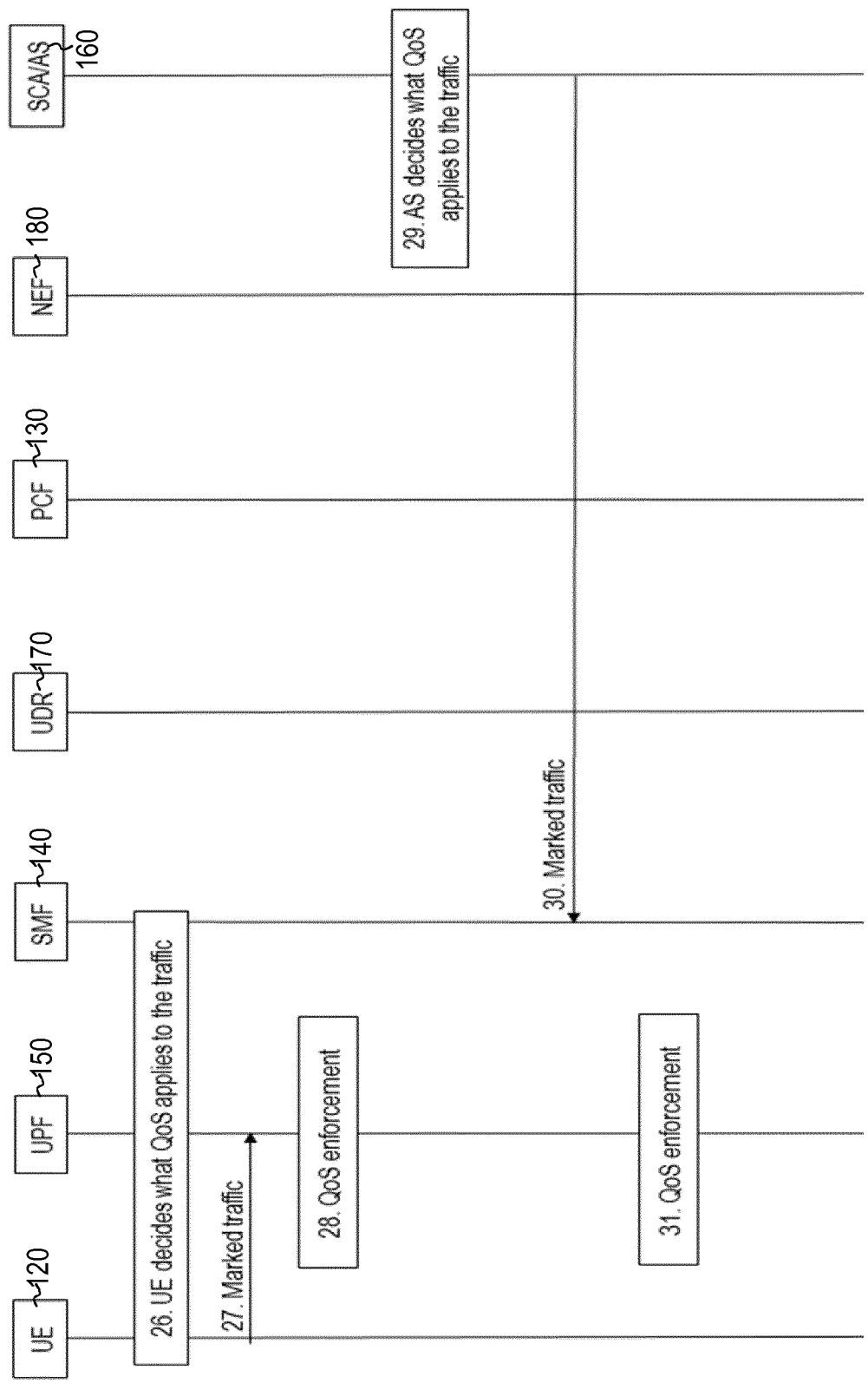

FIG. 8*a* steps 1-14, b steps 15-25 and c steps 26-31 depicts the detailed steps for a 5G implementation according to embodiments herein.

The 5G implementation is equivalent to the 4G implementation but with the following differences:
 It uses 5G nodes instead of 4G nodes wherein, the policy node 130 is referred to PCF 130, the control plane node 140 is referred to SMF 140, the user plane node 150 is referred to as UPF 150, the AS node 160 is referred to as a SCS/AS 160, the subscriber database node 170 is referred to as a SPR/UDR/HSS 170, and the service capability exposure node 180 is referred to as a NEF 180.
 The marking is configured in UPF upon PDU session establishment instead upon UE attachment.
 The User-ID and User-group parameters are used, instead of the 4G IMSI and IMSI-group.

Figure 9A:
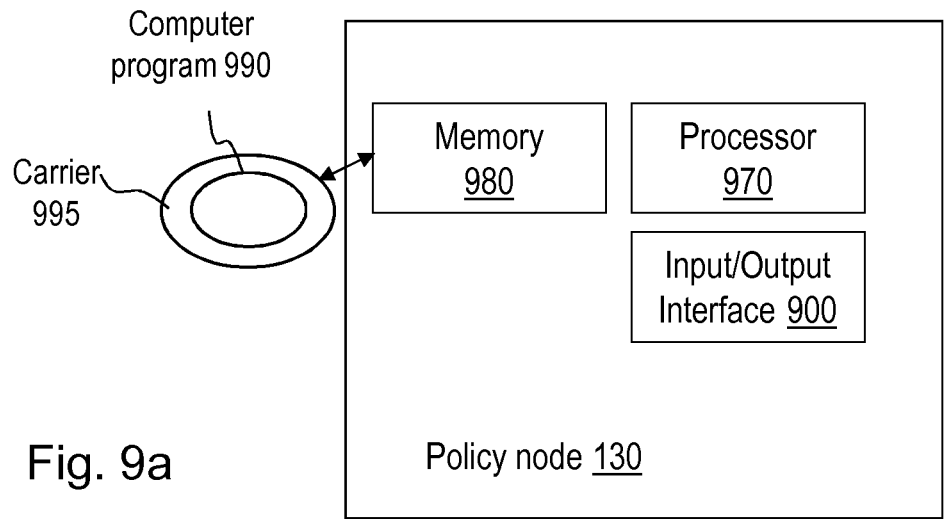
FIGS. 9 *a* and *b* are a schematic block diagrams illustrating embodiments of a policy node.
Figure 9B:
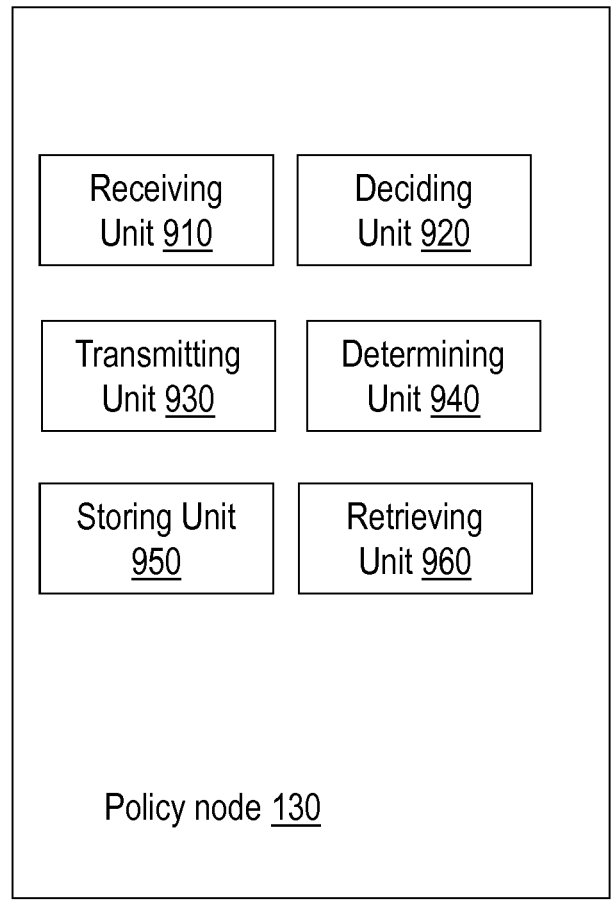

To perform the method actions, the policy node 130 may comprise the arrangement depicted in FIGS. 9*a* and 9*b*. The policy node 130 is configured to handle QoS for data traffic between the UE 120 and the AS node 160 associated with the UE 120 in a wireless communications network 100.

The policy node 130 may comprise an input and output interface 900 configured to communicate e.g. with network nodes in the wireless communications network 100.

The policy node 130 is configured to, e.g. by means of a receiving unit 910 in the policy node 130, receive from the control plane node 140 serving the UE 120, a first message adapted to comprise information indicating one or more available marking types, which a user plane node 150 is capable of detecting in the data traffic.

The policy node 130 is configured to, e.g. by means of the receiving unit 910 in the policy node 130, receive from the AS node 160, a second message adapted to comprise information indicating a number of marking types supported by both the UE 120 and the AS node 160, a UE identifier identifying the UE 120, and a list of QoS profiles associated with the UE 120.

The policy node 130 is configured to, e.g. by means of a deciding unit 920 in the policy node 130, decide a marking type and a marking value for each of the QoS profiles based on the information of the first message and the second message.

The policy node 130 is configured to, e.g. by means of a transmitting unit 930 in the policy node 130, transmit in a third message to the AS node 160, the decided marking type and marking value for each of the QoS profiles.

The policy node 130 is configured to, e.g. by means of the receiving unit 910 in the policy node 130, receive from the control plane node 140, a fourth message adapted to comprise a session establishment request with a UE identifier identifying the UE 120, which session establishment request is adapted to be related to data traffic between the UE 120 and the AS node 160.

The policy node 130 is configured to, e.g. by means of a determining unit 940 in the policy node 130, determine the decided marking type and marking value for each of the QoS profiles associated with the UE identifier.

The policy node 130 is configured to, e.g. by means of the transmitting unit 930 in the policy node 130, transmit towards the control plane node 140, a fifth message adapted to comprise a session establishment response for the UE identifier including the marking type and marking value decided for each QoS profile associated with the UE identifier.

In some embodiments, the UE identifier identifying the UE 120, to be received in the second message, is represented by a group identifier identifying a user group comprising other UEs and the UE 120.

In these embodiments, the policy node 130 may further be configured to, e.g. by means of a determining unit 940 in the policy node 130, determine the decided marking type and marking value for each of the QoS profiles associated with the UE identifier, by performing it for each of the QoS profiles associated with the group identifier, to all the UEs within the user group.

In some embodiments, the policy node 130 may further be configured to, e.g. by means of a storing unit 950 in the policy node 130, store in a subscriber database, the UE identifier associated with the marking type and marking value for each QoS profile.

In some embodiments, the policy node 130 may further be configured to, e.g. by means of a retrieving unit 960 in the policy node 130, retrieve from the subscriber database, the marking type and marking value for each QoS profile, for the UE identifier.

Those skilled in the art will also appreciate that the units in the policy node 130 mentioned above may refer to a combination of analog and digital circuits, and/or one or more processors configured with software and/or firmware, e.g. stored in the policy node 130 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 970 of a processing circuitry in the policy node 130 depicted in FIG. 9a, together with respective computer program code for performing the functions and actions of the embodiments herein. The program code mentioned above may also be provided as a computer program product, for instance in the form of a data carrier carrying computer program code for performing the embodiments herein when being loaded into the policy node 130. One such carrier may be in the form of a CD ROM disc. It is however feasible with other data carriers such as a memory stick. The computer program code may furthermore be provided as pure program code on a server and downloaded to the policy node 130.

The policy node 130 may further comprise a memory 980 comprising one or more memory units. The memory comprises instructions executable by the processor in the policy node 130.

The memory is arranged to be used to store e.g. available marking types, which a user plane node 150 is capable of detecting in the data traffic, marking types supported by both the UE 120 and the AS node 160, lists of QoS profiles associated with the UE, marking types and marking values for each of the QoS profiles, UE identifiers, group identifiers, UE identifiers associated with the marking type and marking value for each QoS profile, and applications to perform the methods herein when being executed in the policy node 130.

In some embodiments, a respective computer program 990 comprises instructions, which when executed by the respective at least one processor, cause the at least one processor of the policy node 130 to perform the actions above.

In some embodiments, a respective carrier 995 comprises the respective computer program, wherein the carrier is one of an electronic signal, an optical signal, an electromagnetic signal, a magnetic signal, an electric signal, a radio signal, a microwave signal, or a computer-readable storage medium.

Figure 10A:
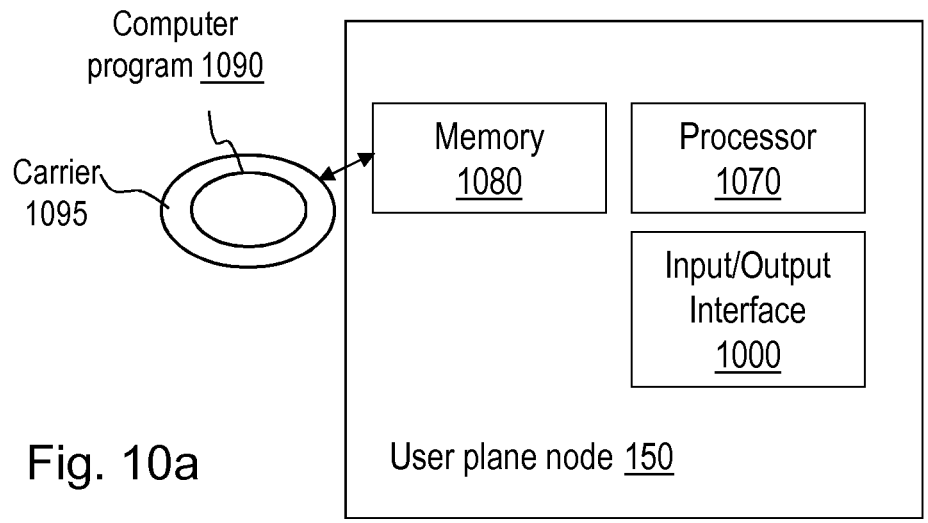
FIGS. 10 *a* and *b* are a schematic block diagrams illustrating embodiments of a user plane node.
Figure 10B:
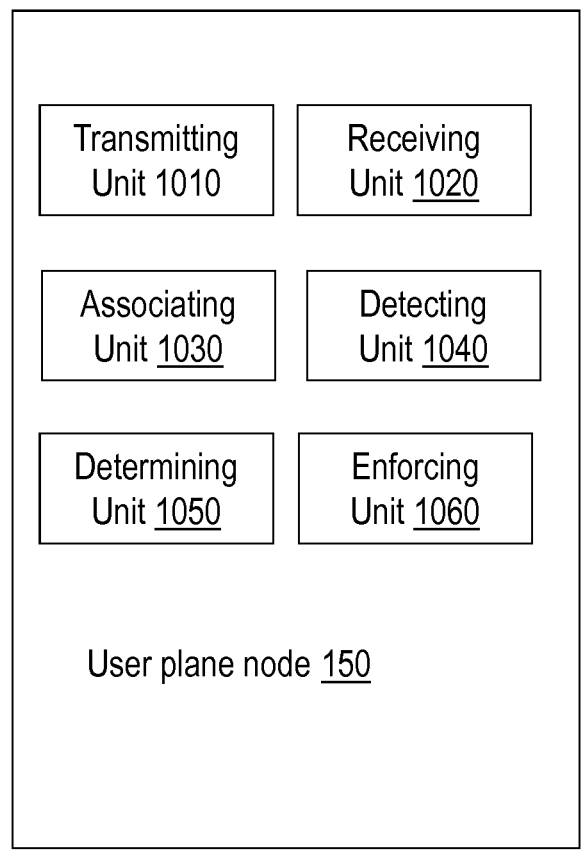

To perform the method actions, the user plane node 150 may comprise the arrangement depicted in FIGS. 10a and 10b. The user plane node 150 is configured to handle QoS for data traffic between the UE 120 and the AS node 160 associated with the UE 120 in a wireless communications network 100.

The user plane node 150 may comprise an input and output interface 1000 configured to communicate e.g. with network nodes in the wireless communications network 100.

The user plane node 150 is configured to, e.g. by means of a transmitting unit 1010 comprised in the user plane node 150, transmit towards a control plane node 140, a first message adapted to comprise information indicating one or more available marking types which the user plane node 150 is capable of detecting in the data traffic.

The user plane node 150 is further configured to, e.g. by means of a receiving unit 1020 comprised in the user plane node 150, receive from the control plane node 140, a sixth message adapted to comprise information partly based on the first message and indicating one or more PDR with respective marking type and marking value and, per PDR, a QER with QoS parameters for a corresponding QoS profile.

The user plane node 150 is further configured to, e.g. by means of an associating unit 1030 comprised in the user plane node 150, associate each marking type and marking value with the corresponding QoS profile, based on the sixth message.

The user plane node 150 is further configured to, e.g. by means of the receiving unit 1020 comprised in the user plane node 150, receive, from at least one of the UE 120 and AS node 160, data traffic indicating a marking type and marked with a marking value to indicate a QoS to be applied.

The user plane node 150 is further configured to, e.g. by means of a detecting unit 1040 comprised in the user plane node 150, detect the marking value for the marking type in the data traffic, The user plane node 150 is further configured to, e.g. by means of a determining unit 1050 comprised in the user plane node 150, determine a corresponding QoS profile associated with the detected marking type and marking value.

The user plane node 150 is further configured to, e.g. by means of an enforcing unit 1060 comprised in the user plane node 150, enforce the determined corresponding QoS profile for the data traffic between the UE 120 and the AS node 160.

Those skilled in the art will also appreciate that the units in the user plane node 150 mentioned above may refer to a combination of analog and digital circuits, and/or one or more processors configured with software and/or firmware, e.g. stored in the user plane node 150 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 1070 of a processing circuitry in the user plane node 150 depicted in FIG. 10a, together with respective computer program code for performing the functions and actions of the embodiments herein. The program code mentioned above may also be provided as a computer program product, for instance in the form of a data carrier carrying computer program code for performing the embodiments herein when being loaded into the user plane node 150. One such carrier may be in the form of a CD ROM disc. It is however feasible with other data carriers such as a memory stick. The computer program code may furthermore be provided as pure program code on a server and downloaded to the user plane node 150.

The user plane node 150 may further comprise a memory 1080 comprising one or more memory units. The memory 1080 comprises instructions executable by the processor in the user plane node 150.

The memory is arranged to be used to store e.g. available marking types, which a user plane node 150 is capable of detecting in the data traffic, marking types supported by both the UE 120 and the AS node 160, lists of QoS profiles associated with the UE, marking types and marking values for each of the QoS profiles, UE identifiers, group identifiers, UE identifiers associated with the marking type and marking value for each QoS profile, data, and applications to perform the methods herein when being executed in the user plane node 150.

In some embodiments, a respective computer program 1090 comprises instructions, which when executed by the respective at least one processor 1070, cause the at least one processor 1070 of user plane node 150 to perform the actions above.

In some embodiments, a respective carrier 1095 comprises the respective computer program, wherein the carrier is one of an electronic signal, an optical signal, an electromagnetic signal, a magnetic signal, an electric signal, a radio signal, a microwave signal, or a computer-readable storage medium.

Figure 11A:
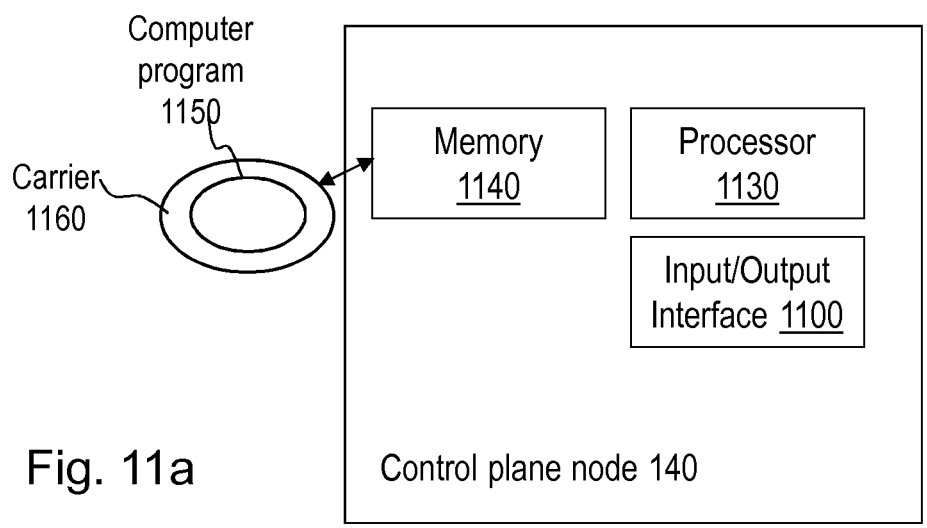
FIGS. 11 *a* and *b* are a schematic block diagrams illustrating embodiments of a control plane node.
Figure 11B:
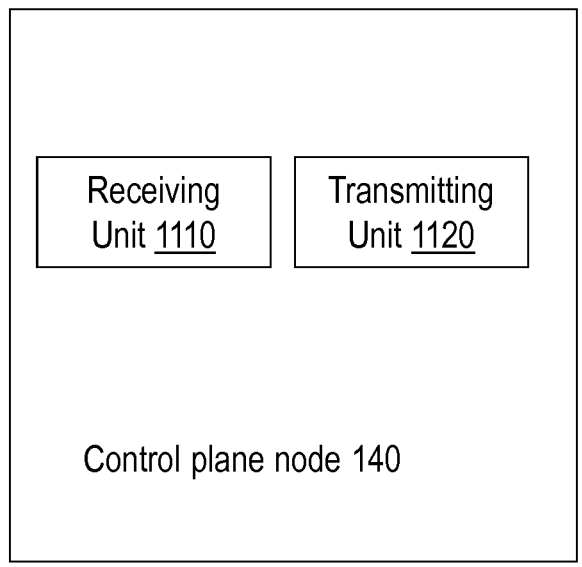

To perform the method actions, the control plane node 140 may comprise the arrangement depicted in FIGS. 11a and 11b. The control plane node 140 is configured to handle QoS for data traffic between the UE 120 and the AS 150 associated with the UE 120 in the wireless communications network 100.

The control plane node 140 may comprise an input and output interface 1100 configured to communicate e.g. with network nodes in the wireless communications network 100.

The control plane node 140 is configured to, e.g. by means of an receiving unit 1110 comprised in the control plane node 140, receive from a user plane node 150, a first message adapted to comprise information indicating one or more available marking types, which the user plane node 150 is capable of detecting in the data traffic.

The control plane node 140 is configured to, e.g. by means of an transmitting unit 1120 comprised in the control plane node 140, transmit towards a policy node 130 the first message adapted to comprise information indicating the one or more available marking types.

The control plane node 140 is configured to, e.g. by means of the transmitting unit 1120 comprised in the control plane node 140, transmit towards the policy node 130, a fourth message adapted to comprise a session establishment request with a UE identifier identifying the UE 120, which session establishment request is adapted to relate to the data traffic between the UE 120 and the AS node 160.

The control plane node 140 is configured to, e.g. by means of the receiving unit 1110 comprised in the control plane node 140, receive from the policy node 130, a fifth message adapted to comprise a session establishment response for the UE identifier including a marking type and marking value decided for each QoS profile associated with the UE identifier, partly based on the information in the first message.

The control plane node 140 is configured to, e.g. by means of an transmitting unit 1120 comprised in the control plane node 140, transmit towards the user plane node 150, a sixth message adapted to comprise information indicating one or more PDR with respective marking type and marking value and, per PDR, a QER with QoS parameters for a corresponding QoS profile based on the information of the fifth message.

Those skilled in the art will also appreciate that the units in the control plane node 140 mentioned above may refer to a combination of analog and digital circuits, and/or one or more processors configured with software and/or firmware, e.g. stored in the control plane node 140 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 1130 of a processing circuitry in the control plane node 140 depicted in FIG. 11a, together with respective computer program code for performing the functions and actions of the embodiments herein. The program code mentioned above may also be provided as a computer program product, for instance in the form of a data carrier carrying computer program code for performing the embodiments herein when being loaded into the control plane node 140. One such carrier may be in the form of a CD ROM disc. It is however feasible with other data carriers such as a memory stick. The computer program code may furthermore be provided as pure program code on a server and downloaded to the control plane node 140.

The control plane node 140 may further comprise a memory 1140 comprising one or more memory units. The memory 1140 comprises instructions executable by the processor in the control plane node 140.

The memory 1140 is arranged to be used to store e.g. available marking types, which a user plane node 150 is capable of detecting in the data traffic, marking types supported by both the UE 120 and the AS node 160, lists of QoS profiles associated with the UE, marking types and marking values for each of the QoS profiles, UE identifiers, group identifiers, UE identifiers associated with the marking type and marking value for each QoS profile, and applications to perform the methods herein when being executed in the control plane node 140.

In some embodiments, a respective computer program 1150 comprises instructions, which when executed by the respective at least one processor 1130, cause the at least one processor of the control plane node 140 to perform the actions above.

In some embodiments, a respective carrier 1160 comprises the respective computer program, wherein the carrier is one of an electronic signal, an optical signal, an electromagnetic signal, a magnetic signal, an electric signal, a radio signal, a microwave signal, or a computer-readable storage medium.

Further Extensions and Variations

Figure 12:
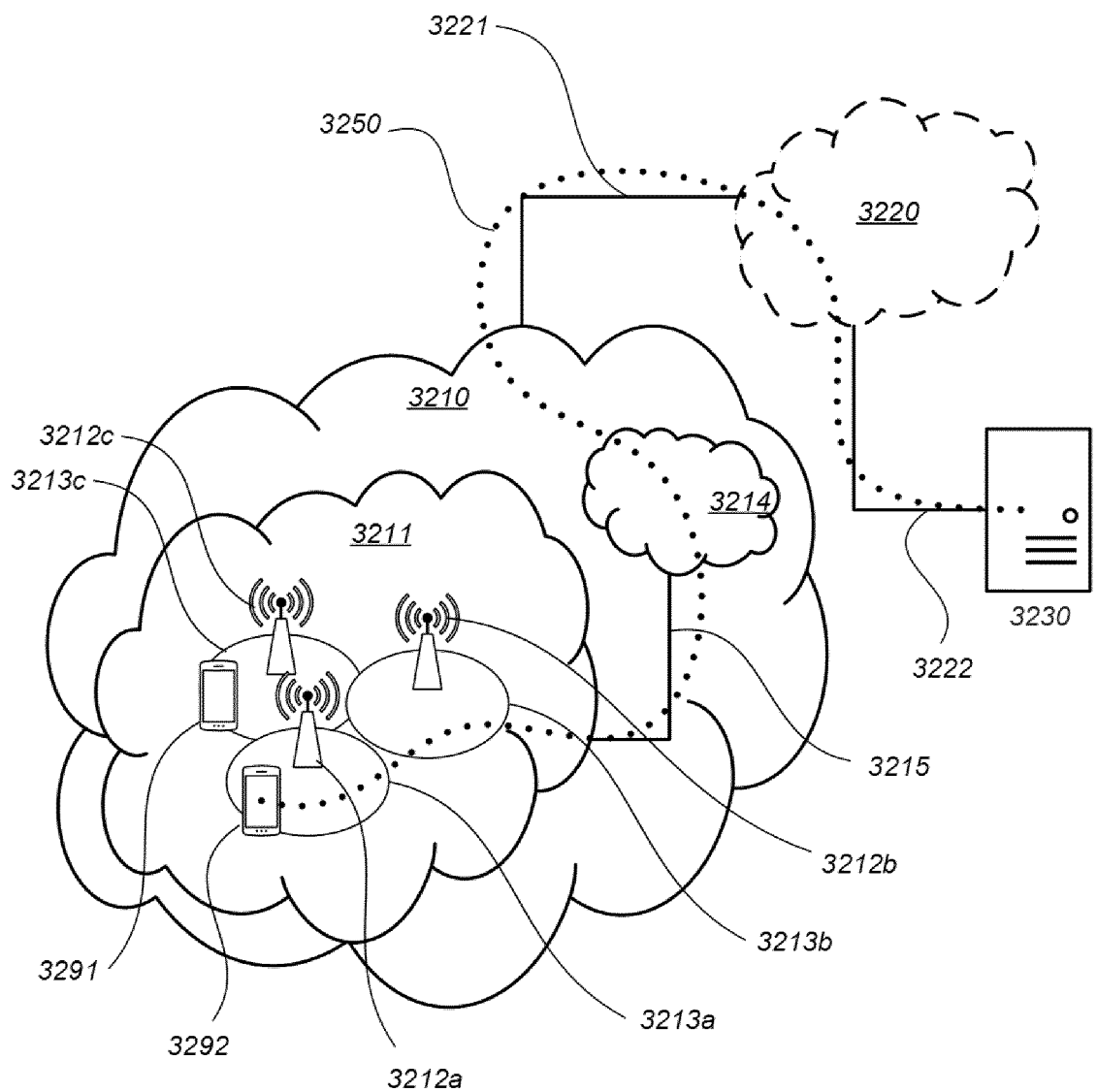
FIG. 12 schematically illustrates a telecommunication network connected via an intermediate network to a host computer.

With reference to FIG. 12, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 13 may be identical to the host computer 3230, one of the base stations 3212*a*, 3212*b*, 3212*c* and one of the UEs 3291, 3292 of FIG. 12, respectively. This is to say, the inner workings of these entities may be as shown in FIG. 13 and independently, the surrounding network topology may be that of FIG. 12.

Figure 13:
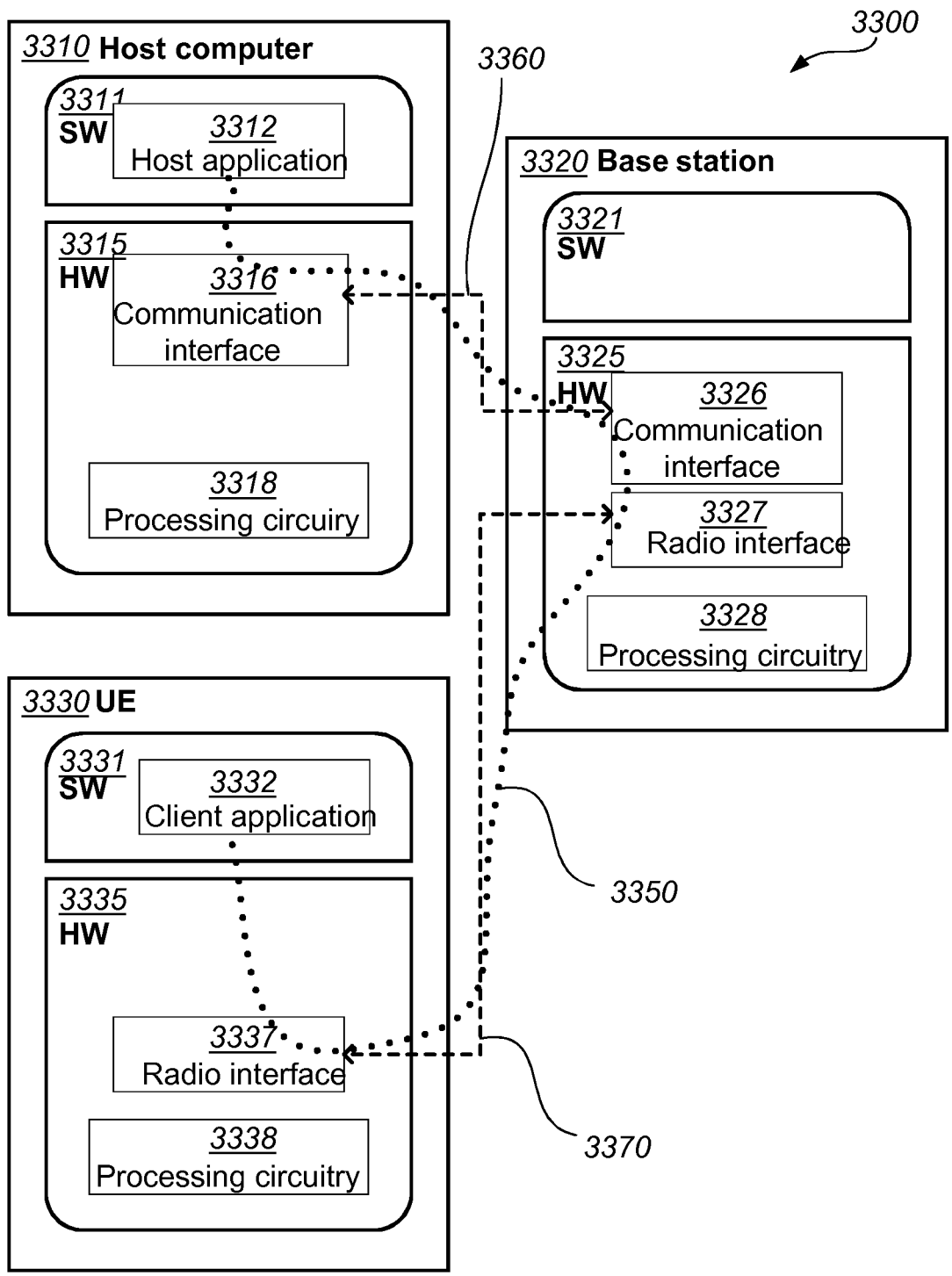
FIG. 13 is a generalized block diagram of a host computer communicating via a base station with a user equipment over a partially wireless connection.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 14, 15:
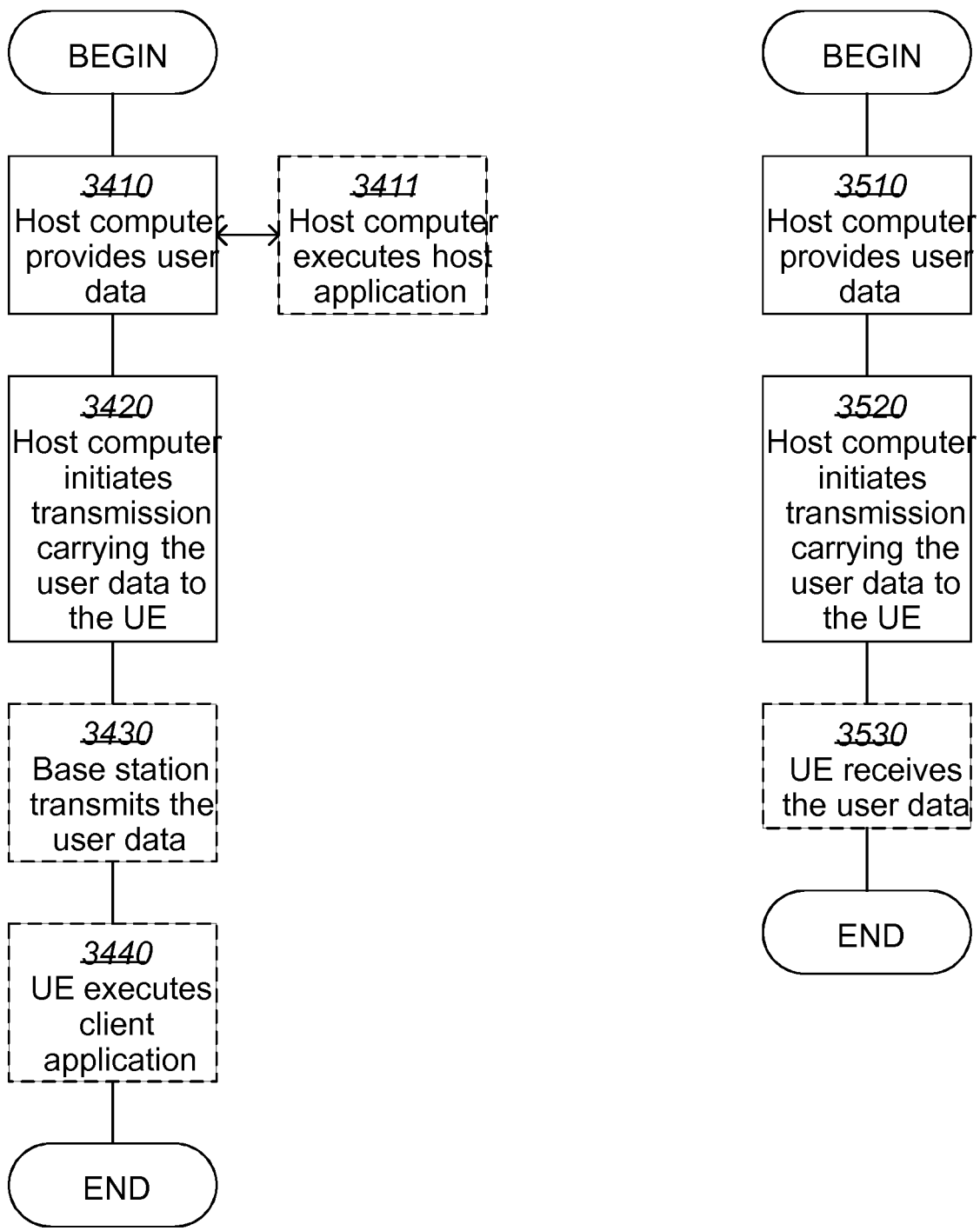

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 14 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 15 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 16 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 16 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 17 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Abbreviations

Abbreviation Explanation
AS Application Server
IE Information Element
JSON JavaScript Object Notation
OTT Over the Top
MTC Machine Type Communications
PGW Packet Gateway
PGW-C PDN Gateway Control plane function
PGW-U PDN Gateway User plane function
PFDF Packet Flow Description Function
PFD Packet Flow Description
TTRI T8 Transaction Reference ID
SCEF Service Capability Exposure Function
SCS/AS Service Capability Server/Application Server
SGW Serving Gateway
SGW-C Serving Gateway Control plane function
SGW-U Serving Gateway User plane function.

The invention claimed is:

1. A policy node configured to handle Quality of Service, QoS, for data traffic between a User Equipment, UE, and an Application Server, AS, node associated with the UE in a wireless communications network, the policy node further being configured to:
  receive, from a control plane node serving the UE, a first message having information indicating one or more available marking types that a user plane node is capable of detecting in the data traffic;
  receive, from the AS node, a second message having information indicating a number of marking types supported by both the UE and the AS node, a UE identifier identifying the UE and a list of QoS profiles associated with the UE;
  decide a marking type and a marking value for each of the QoS profiles associated with the UE based on the information in the first message and the second message;
  transmit, in a third message to the AS node, the decided marking type and the decided marking value for each of the QoS profiles associated with the UE;
  receive, from the control plane node, a fourth message having a session establishment request with the UE identifier identifying the UE, the session establishment request being related to the data traffic between the UE and the AS node;
  determine, for inclusion in a session establishment response to be transmitted to the control plane node, the decided marking type and the decided marking value for each of the QoS profiles associated with the UE identifier; and
  transmit, to the control plane node, a fifth message having the session establishment response for the UE identifier, the session establishment response including the decided marking type and the decided marking value decided for each QoS profile associated with the UE identifier.

2. The policy node according to claim 1, wherein the UE identifier identifying the UE, received in the second message, is represented by a group identifier identifying a user group comprising the UE and other UEs; and
  wherein the policy node is further configured to determine the decided marking type and the decided marking value for each of the QoS profiles associated with the group identifier, for all the UEs within the user group.

3. The policy node according to claim 2, being further configured to:
  store in a subscriber database, the UE identifier associated with the decided marking type and the decided marking value for each QoS profile.

4. The policy node according to claim 3, being further configured to:
  retrieve, from the subscriber database, the decided marking type and the decided marking value for each QoS profile, for the UE identifier.

5. The policy node according to claim 1, being further configured to:
  store, in a subscriber database, the UE identifier associated with the decided marking type and the decided marking value for each QoS profile.

6. The policy node according to claim 5, being further configured to:
  retrieve, from the subscriber database, the decided marking type and the decided marking value for each QoS profile, for the UE identifier.

7. A user plane node, configured to handle Quality of Service, QoS, for data traffic between a User Equipment, UE, and an Application Server, AS, node associated with the UE in a wireless communications network, the user plane node further being configured to:
  transmit, to a control plane node serving the UE, a first message having information indicating one or more available marking types that the user plane node is capable of detecting in the data traffic;
  receive, from the control plane node, the control plane node being in communication with a policy node and the policy node being in communication with the AS node, a second message having information indicating one or more Packet Detection Rules, PDR, with a respective marking type decided by the policy node and a respective marking value decided by the policy node and, per PDR, a QoS enforcement rule, QER, with QoS parameters for a corresponding QoS profile associated with the UE, the respective marking type and the respective marking value decided by the policy node based on:
    the information in the first message indicating the one or more available marking types that the user plane node is capable of detecting in the data traffic, the information in the first message being received by the policy node from the control plane node; and second information indicating a number of marking types supported by both the UE and the AS node, a UE identifier identifying the UE and a list of QoS profiles associated with the UE, the second information received by the policy node from the AS node;

receive, from at least one of the UE and the AS node, data traffic indicating the marking type and marked with the marking value decided by the policy node to indicate a QoS to be applied;

detect the marking value for the marking type in the data traffic;

determine a corresponding QoS profile associated with the detected marking type and the detected marking value; and enforce the determined corresponding QoS profile for the data traffic between the UE and the AS node.

8. A control plane node, configured to handle Quality of Service, QoS, for data traffic between a User Equipment, UE, and an Application Server, AS, node associated with the UE in a wireless communications network, the control plane node serving the UE and further being configured to:

receive, from a user plane node, a first message having information indicating one or more available marking types that the user plane node is capable of detecting in the data traffic;

transmit, to a policy node the first message having information indicating the one or more available marking types that the user plane node is capable of detecting in the data traffic;

transmit, to the policy node, a second message having a session establishment request with a UE identifier identifying the UE, the session establishment request being related to the data traffic between the UE and the AS node;

receive, from the policy node, a third message having a session establishment response for the UE identifier including a marking type and a marking value decided by the policy node for each QoS profile associated with the UE identifier, the marking type and the marking value that are decided by the policy node for each QoS profile associated with the UE identifier and included in the session establishment response being based on the information in the first message received by the policy node from the control node and second information received by the policy node from the AS node, the second information indicating a number of marking types supported by both the UE and the AS node, the UE identifier identifying the UE and a list of QoS profiles associated with the UE; and transmit, to the user plane node, a fourth message having information indicating one or more Packet Detection Rules, PDR, with a respective marking type decided by the policy node and a respective marking value decided by the policy node and, per PDR, a QoS Enforcement Rule, QER, with QoS parameters for a corresponding QoS profile based on information in the third message.

* * * * *